United States Patent
Araya et al.

(10) Patent No.: US 11,845,009 B2
(45) Date of Patent: Dec. 19, 2023

(54) INFORMATION PROCESSING SYSTEM, INFORMATION PROCESSING APPARATUS, STORAGE MEDIUM AND INFORMATION PROCESSING METHOD

(71) Applicant: NINTENDO CO., LTD., Kyoto (JP)

(72) Inventors: So Araya, Kyoto (JP); Yuji Ohashi, Kyoto (JP); Keisuke Ohtani, Kyoto (JP); Tetsuro Matsuzaki, Kyoto (JP); Kouhei Maeda, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 297 days.

(21) Appl. No.: 17/108,478

(22) Filed: Dec. 1, 2020

(65) Prior Publication Data
US 2021/0162307 A1    Jun. 3, 2021

(30) Foreign Application Priority Data
Dec. 2, 2019   (JP) ................................ 2019-218062

(51) Int. Cl.
*A63F 13/67*     (2014.01)
(52) U.S. Cl.
CPC .................................. *A63F 13/67* (2014.09)
(58) Field of Classification Search
CPC ........ A63F 13/67; A63F 13/35; A63F 13/847; A63F 13/798
See application file for complete search history.

(56) References Cited

U.S. PATENT DOCUMENTS

| | | | | |
|---|---|---|---|---|
| 7,253,819 | B1* | 8/2007 | Ganea | ...................... H04N 9/68 345/589 |
| 2007/0202937 | A1* | 8/2007 | Peires | ................. G07F 17/3295 463/9 |
| 2021/0060438 | A1* | 3/2021 | Oe | .......................... A63F 13/69 |

FOREIGN PATENT DOCUMENTS

WO    WO-2019215926 A1 *  11/2019

OTHER PUBLICATIONS

WO-2019215926-A1, Machine Translation (Year: 2019).*
[Online], "What's in Store for the 2.11.0 Update", Fire EMBLEM Heroes, Nintendo Co., Ltd., <https://fire-emblem-heroes.com/en/topics/index.html?id=detail-20181108-2>, searched and printed on Dec. 1, 2020, 152 pages.

* cited by examiner

*Primary Examiner* — James S. McClellan
*Assistant Examiner* — Ross A Williams
(74) *Attorney, Agent, or Firm* — Nixon & Vanderhye P.C.

(57) ABSTRACT

A game period is common among a plurality of users and includes a first period and a second period. An example information processing system advances a first game for each user in the first period. A rank of each user is determined based on a first individual parameter of the user for the first game from a past game period. A second individual parameter is determined for each user based on the rank of the user and the first individual parameter of the user for the first game from a current game period. In the second period, the information processing system determines a common parameter that is common among the plurality of users based on the second individual parameters for users who have performed a particular game input so as to advance a second game that is common among the plurality of users based on the common parameter.

22 Claims, 19 Drawing Sheets

INFORMATION PROCESSING SYSTEM, INFORMATION PROCESSING APPARATUS, STORAGE MEDIUM AND INFORMATION PROCESSING METHOD

CROSS REFERENCE TO RELATED APPLICATION

This application claims priority to Japanese Patent Application No. 2019-218062, filed on Dec. 2, 2019, the entire contents of which are incorporated herein by reference.

FIELD

The present disclosure relates to an information processing system, an information processing apparatus, a storage medium and an information processing method for a game that is played by a plurality of users.

BACKGROUND AND SUMMARY

There are conventional game systems in which a rank (also called a "rate") of each user is determined based on the result of a game played by the user.

The conventional systems had room for improvement in terms of the link between a game that is played individually by each of a plurality of users and a game that is played by the plurality of users cooperating with each other.

Thus, the present application discloses an information processing system, an information processing apparatus a storage medium and an information processing method, with which it is possible to realize a game played by a plurality of users, the game including a first game that is played individually by each player and a second game that is played by the plurality of users cooperating with each other, wherein the first game and the second game are linked together.

(1)
An example of an information processing system described in the present specification comprises a processor and a memory coupled thereto. The processor is configured to control the information processing system to at least: manage a game period that is common among a plurality of users, the game period including a first period and a second period following the first period; advance a first game for each user in the first period; determine an individual reward for each user based on a first individual parameter representing a result of the first game for the user; obtain a rank of each user that is determined based on the first individual parameter of the user for the first game from a past game period; determine a second individual parameter for each user based on the rank of the user and the first individual parameter of the user for the first game from a current game period; in the second period, determine a common parameter that is common among the plurality of users based on the second individual parameters for users who have performed a particular game input so as to advance a second game that is common among the plurality of users based on the common parameter; and determine a common reward that is common among the plurality of users based on a result of the second game.

With configuration (1) above, the information processing system executes the second game played by a plurality of users cooperating with each other, while reflecting the result of the first game that is played individually by each of the plurality of users (i.e., the first individual parameter). Thus, it is possible to realize a game played by a plurality of users, the game including the first game and the second game, which are linked together.

(2)
The processor may be configured to control the information processing system to at least determine the second individual parameter in accordance with a point in time within the second period at which the particular game input is performed.

With configuration (2) above, it is possible to give a strategic aspect to the second game and to improve the playability of the game including the first game and the second game.

(3)
The second period may be divided into a plurality of sub-periods. The processor may be configured to control the information processing system to at least determine the common parameter based on a total number of times the particular game input has been performed by the plurality of users within one sub-period.

(4)
The processor may be configured to control the information processing system to at least, after an end of a sub-period, determine the common parameter based on the second individual parameters in accordance with the particular game inputs that have been performed by the plurality of users in the sub-period.

With configuration (3) or (4) above, the value of the common parameter based on the particular game input of a user varies depending on the number of times the particular game input has been performed by other users in the sub-period. Thus, it is possible to give a strategic aspect to the particular game input performed by the users, and to improve the playability of the game.

(5)
The processor may be configured to control the information processing system to at least: receive, from the user, an input that specifies a number of times within an upper limit, together with the particular game input, in the second period; and when the particular game input is performed by the user in the second period, determine the second individual parameter based on the number of times specified by the user and the first individual parameter of the user.

With configuration (5) above, as the number of times is specified by the user when performing the particular game input, it is possible to improve the strategic aspect of the second game and to improve the playability of the game.

(6)
The second period may be divided into a plurality of sub-periods. The processor may be configured to control the information processing system to at least, based on a result of comparison between the common parameter up to a point in time when each sub-period in the second period ends and a reference value, determine the second individual parameter in accordance with the particular game inputs that are performed in one sub-period after the point in time.

With configuration (6) above, the second individual parameter is determined based on the status (i.e., the result of comparison between the common parameter and the reference value) up to the current point in time in the second period. Thus, it is possible to improve the strategic aspect of the second game and to improve the playability of the game.

(7)
The processor may be configured to control the information processing system to at least determine the rank of each user in the current game period based on a result of comparison between the first individual parameter of the user for the first game from a past game period and the first individual parameter of another user for the first game from the past game period.

With configuration (7) above, the second game is played by a plurality of users cooperating with each other, whereas there remains a desirable competition between the users in the first game. Thus, it is possible to improve the playability of the game as a whole including the first game and the second game.

(8)

The processor may be configured to control the information processing system to at least determine a new rank for each user based on the rank of the user and a result of comparison for the first individual parameter of the user in the current game period, wherein the rank of the user is determined based on the first individual parameter of the user for the first game from one or more game periods including at least the previous game period.

With configuration (8) above, since a new rank is determined reflecting the rank from the previous game period, the new rank is more likely to reflect the game result from past game periods. Thus, it is possible to motivate the users to continuously (e.g., each time a game period arrives) play the game including the first game and the second game so that more users participate in the game.

(9)

The processor may be configured to control the information processing system to at least determine the first individual parameter for the user based on an ability parameter that represents an ability of a game object used in the first game.

With configuration (9) above, it is possible to improve the strategic aspect in conjunction with the selection of the game object used in the first game, and it is possible to improve the playability of the game.

(10)

The processor may be configured to control the information processing system to at least determine the first individual parameter of the user that is determined in the first period of the current game period based on the rank that is determined based on the first individual parameter of the user for the first game from one or more game periods including at least the previous game period.

With configuration (10) above, the user is more likely to realize the first individual parameter of a higher value by improving the rank by continuously playing the first game. Thus, it is possible to motivate the user to continuously play the game including the first game and the second game so that more users participate in the game.

(11)

The processor may be configured to control the information processing system to at least set a designation period in which a particular player character is designated. In the designation period, the processor may vary the value of the first individual parameter for the first game depending on whether or not the game object used in the first game is the particular game object that is designated in the designation period.

With configuration (11) above, it is possible to improve the strategic aspect in conjunction with the selection of the game object used in the first game, and it is possible to improve the playability of the game.

(12)

The processor may be configured to control the information processing system to at least determine the ability of the opponent object appearing in the first game based on the ability parameter of the game object used by the user in the first game.

With configuration (12) above, in the first game, an opponent object appears having a strength in accordance with the strength of the game object used by the user.

(13)

The processor may be configured to control the information processing system to at least: determine the first individual parameter so that a value of the first individual parameter is higher as an evaluation of a result of the first game is better; and determine the second individual parameter so that the plurality of users have more advantage playing the second game as the first individual parameter is higher.

With configuration (13) above, it is possible to motivate the user to play the game well so as to obtain a good result also in the first game in order to obtain a good result in the second game. Thus, it is possible to improve the playability of the game as a whole, wherein the second game is played while reflecting the result of the first game.

(14)

The processor may be configured to control the information processing system to at least: allow one user to play the first game a plurality of times in the first period; and when the first game is played a plurality of times by the user in the first period, determine the second individual parameter of the user based on a highest or lowest one of the first individual parameters for the user in the first period.

With configuration (14) above, it is possible to motivate the user to repeatedly play the first game.

(15)

The processor may be configured to control the information processing system to at least exclude a user or users who have not performed the particular game input in the second period from a group of users who are given the common reward.

With configuration (15) above, it is possible to prevent the motivation for the user to play the second game from lowering.

(16)

The processor may be configured to control the information processing system to at least determine the second individual parameter based on the first individual parameter of a predetermined value for a user or users, among the plurality of users, who have not performed the first game in the first period of the current game period.

With configuration (16) above, it is possible to increase the number of participants in the second game, thereby improving the playability of the second game.

(17)

The second period may be divided into a plurality of sub-periods. The processor may be configured to control the information processing system to at least evaluate the second game based on the common parameter for each of the sub-periods, and determine the common reward based on the evaluation for the sub-period.

With configuration (17) above, it is possible to direct each user's attention also to the in-progress game status of the second game, and it is possible to further improve the strategic aspect of the second game.

(18)

The processor may set the pre-match period before the first period in a game period. During the pre-match period in the game period, the processor may be configured to control the information processing system to at least generate a pre-match information image including information of at least one of the first game and the second game in that game period.

With configuration (18) above, it is possible, with the pre-match information image, to notify the user of the arrival of the first period and the second period, and to present to the user information regarding the first game and/or the second game.

(19)

The processor may be configured to control the information processing system to at least: based on an instruction from the user, arrange a game object of a first type and a game object of a second type on a game map used in the first game, wherein the game object of the first type is controlled by the user and the game object of the second type influences at least one of the game object of the first type and an opponent object.

With configuration (19) above, since the user can give instructions to arrange the game objects, it is possible to improve the strategic aspect of the first game and to improve the playability of the first game.

(20)

The processor may be configured to control the information processing system to at least determine an item used for creating or strengthening a game object of the second type as the individual reward.

With configuration (20) above, the user who is given the individual reward can create or strengthen game objects of the second type by using the item so that the user can play the first game with more advantage. Therefore, with configuration (20) above, it is possible to motivate the user to repeatedly play the first game.

(21)

The processor may be configured to control the information processing system to at least give a property of not being attacked by an opponent object to one or more game object of game objects of a first type, and allow the game object that is given the property to be arranged on the game map at least on the condition that it is arranged in a partial area of the game map.

With configuration (21) above, some game objects are assigned a different role from other game objects, thereby improving the strategic aspect of the first game.

Note that the present specification discloses an information processing apparatus (e.g., a terminal apparatus or a server) that includes some or all of the elements recited in (1) to (21) above. The present specification also discloses a storage medium storing an information processing program that causes a computer to function as some or all of the elements recited in (1) to (21) above. The present specification also discloses an information processing method that is executed by the information processing system of (1) to (21) above.

With the information processing system, the information processing apparatus, the storage medium and the information processing method set forth above, it is possible to realize a game played by a plurality of users, the game including a first game that is played individually by each player and a second game that is played by the plurality of users cooperating with each other, wherein the first game and the second game are linked together.

These and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

1. Configuration of Information Processing System

Figure 1:
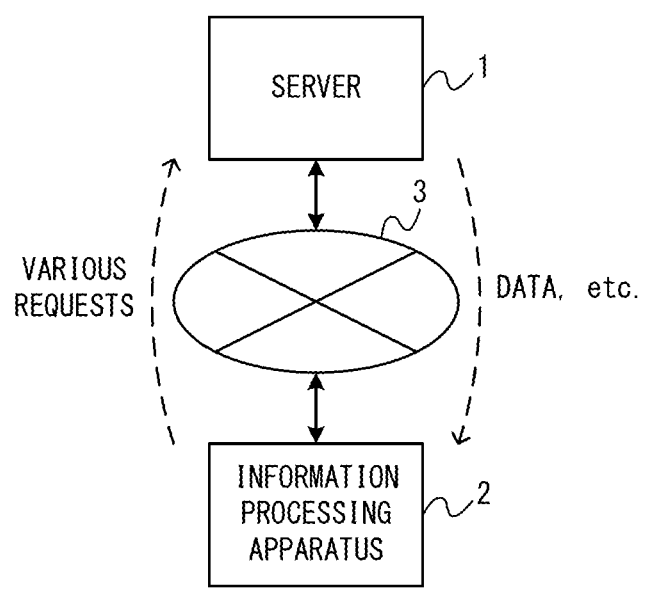
FIG. 1 is a block diagram showing an example of a configuration of a non-limiting information processing system according to the present embodiment.

Hereinafter, an information processing system, an information processing program, and an information processing method according to the present embodiment will be described. Firstly, description will be given of the overall configuration of the information processing system and the configurations of the terminal apparatus and a server included in the information processing system according to the present embodiment. FIG. 1 is a block diagram showing an example of the configuration of the information processing system according to the present embodiment. As shown in FIG. 1, the information processing system includes a server 1 and a terminal apparatus 2. The server 1 and the terminal apparatus 2 are connectable to a network 3, such as the Internet and/or a mobile communication network. The server 1 and the terminal apparatus 2 are communicable with each other via the network 3.

The server 1 is a server for providing services related to an application (specifically, a game application) to be executed in the terminal apparatus 2. In the present embodiment, the server 1 is a game server for a game to be executed in the terminal apparatus 2, and provides an environment for a game process to be executed in the terminal apparatus 2. For example, in response to a request from the terminal apparatus 2 that executes the game process, the server 1 executes a game process according to need, and transmits, to the terminal apparatus 2, data complying with the request (refer to FIG. 1).

The terminal apparatus 2 is an example of an information processing apparatus possessed by a user. Examples of the terminal apparatus 2 include a smart phone, a hand-held or stationary game apparatus, a mobile phone, a tablet terminal, a personal computer, and a wearable terminal. The terminal apparatus 2 is able to execute a game program (in other words, a game application) for a game for which the server 1 provides services.

(Specific Example of Configuration of Server 1)

Figure 2:
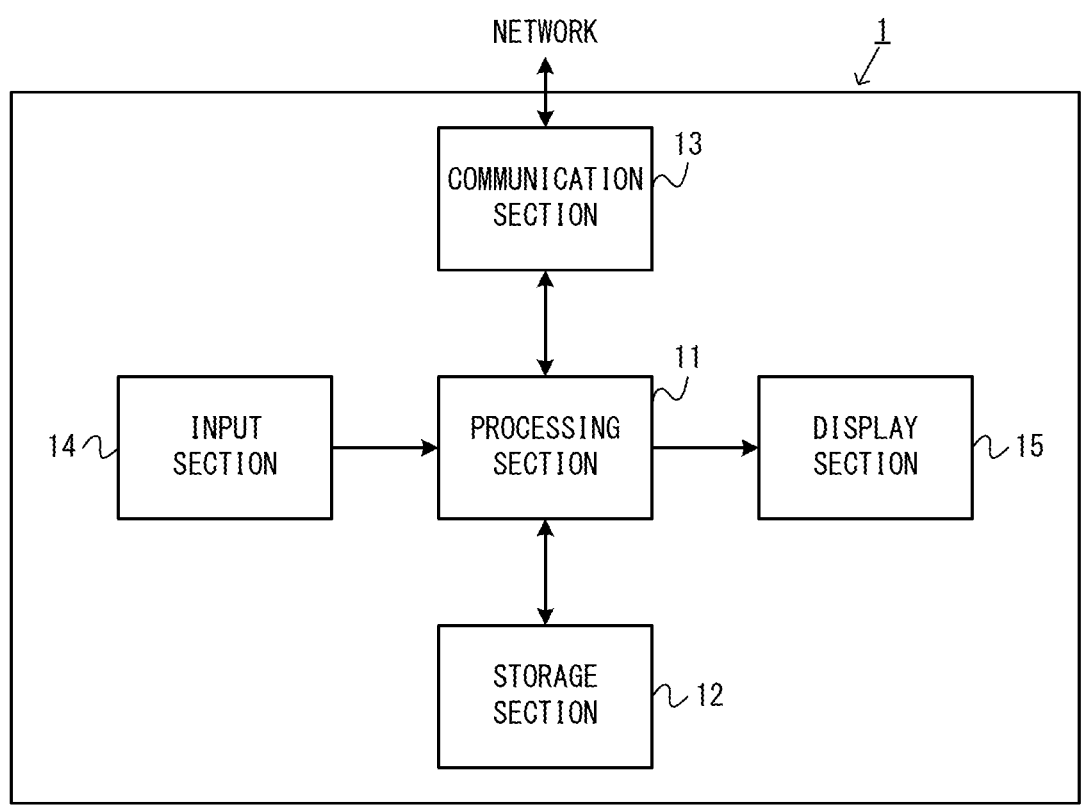
FIG. 2 is a block diagram showing an example of a configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 stores therein at least a program for a game process that is to be executed on the server side for a game process to be executed in the terminal apparatus 2.

The server 1 includes a communication section 13. The communication section 13 is connected to the network 3, and has a function of communicating with other devices (e.g., the terminal apparatus 2) via the network 3. The server 1 further includes an input section 14 and a display section 15 as input/output interfaces.

(Specific example of configuration of terminal apparatus 2)

Figure 3:
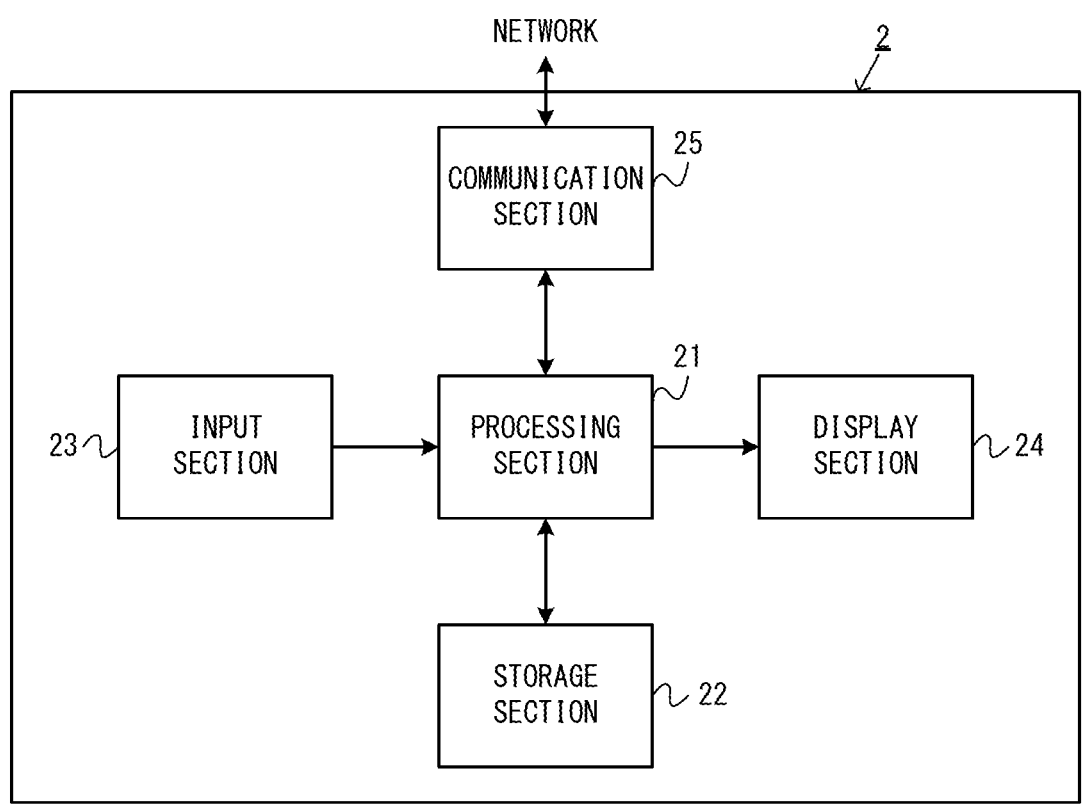
FIG. 3 is a block diagram showing an example of a configuration of a non-limiting information processing apparatus.

FIG. 3 is a block diagram showing an example of the configuration of the terminal apparatus 2. As shown in FIG. 3, the terminal apparatus 2 includes a processing section 21 and a storage section 22. The processing section 21 is electrically connected to the components 22 to 25 of the terminal apparatus 2. The processing section 21 includes a CPU (in other words, a processor) and a memory. In the terminal apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the terminal apparatus 2, or may be a storage medium (e.g., a card type storage medium) attachable/detachable with respect to the main body unit. The program may be stored in the main body unit by being downloaded from the server 1 to the terminal apparatus 2.

The terminal apparatus 2 includes an input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the terminal apparatus 2, or may be an input device (e.g., a game controller) separated from the main body unit.

The terminal apparatus 2 includes a display section 24. The display section 24 displays an image (e.g., a game image, etc.) that is generated through information processing executed in the processing section 21 of the terminal apparatus 2. The display section 24 may be a display device provided in the main body unit of the terminal apparatus 2, or may be a display device separated from the main body unit. The terminal apparatus 2 may include a speaker, a microphone, and/or a camera, etc.

The terminal apparatus 2 includes a communication section 25. In the present embodiment, the communication section 25 has a function of performing communication while being connected to a mobile communication network (in other words, a mobile telephone communication network). That is, the terminal apparatus 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the terminal apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

2. Outline of Process in Information Processing System

The outline of the process that is executed in an information processing system according to the present embodiment will be described. In the present embodiment, a game that uses game characters (hereinafter referred to simply as "characters") is executed in a game application in the information processing system. In the present embodiment, a simulation game is played in which a character, regarded as a unit (in other words, a piece), battles against an opponent unit. Note that the game that uses characters may be of any type, and it may be a puzzle game or a role playing game. A character is a person appearing in the game, for example, but it is not limited to a person as long as it has a characteristic whereby the character can be distinguished from others in the settings of the game. For example, a character may be an animal, a weapon, an item, etc.

Note that in the present embodiment, a user is given a character in the game application. For example, in the information processing system, a character may be selected in a random drawing that costs a predetermined item, and the user may be given the selected character. The user may be given a predetermined character as a reward for achieving a predetermined objective related to the game in the application. The user plays the game using the character given to the user.

In the present embodiment, the information processing system executes a game application including two types of games (the individual match game and the team match game to be described below) in which a plurality of users (or "players") can participate during a predetermined game period. Note that in the present embodiment, the game application includes a game mode in which the two types of games are played (hereinafter referred to as the "combined game mode"), and also a game mode that is different from the combined game mode and that can be used irrespective of whether the current period is the game period. Note that in other embodiments, the game application may not include the other game mode.

Figure 4:
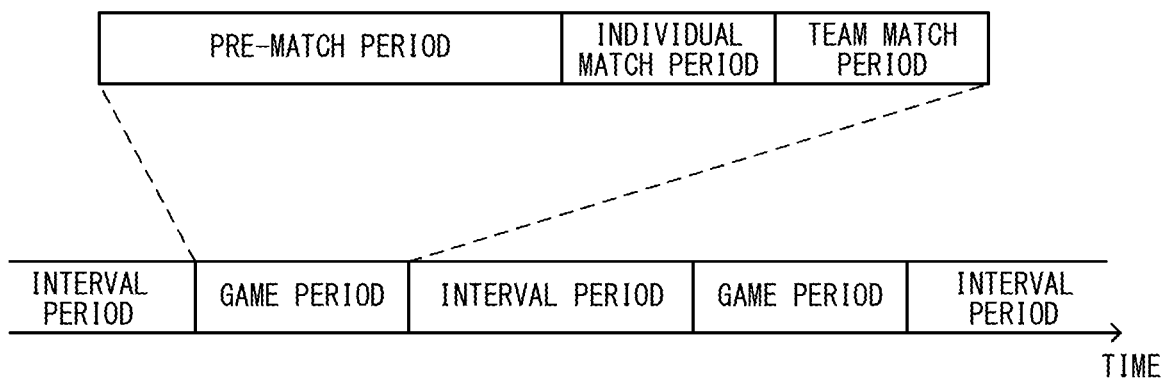
FIG. 4 is a diagram showing an example of a game period set in a non-limiting game application that is executed in a non-limiting information processing system.

FIG. 4 is a diagram showing an example of a game period set in the game application that is executed in the information processing system. As shown in FIG. 4, in the game application, the game period arrives repeatedly over time (real time). In the present embodiment, a period is provided between the end of one game period and the start of the next game period. Note that a period between a game period and the next game period (i.e., a period other than the game period) is referred to as an interval period. Note that in other embodiments, a game period may start continuously following the end of another game period. The interval period may be of any length, and different interval periods may have a fixed length or may have different lengths. That is, game periods may arrive periodically or may arrive non-periodically.

As shown in FIG. 4, a game period is divided into a pre-match period, an individual match period and a team match period. A game period starts with a pre-match period, which is followed by an individual match period, which is followed a team match period. Note that while these three periods are continuous with each other in the present embodiment, the pre-match period and the individual match period may not be continuous with each other, and the individual match period and the team match period may not be continuous with each other, in other embodiments.

A pre-match period is a period in which the user is notified that an individual match game and a team match game will start (i.e., an individual match period and a team match period will arrive). An individual match period is a period in which an individual match game is played. Herein, an individual match game is a game that is played individually by each of a plurality of participating users. Note that in the present embodiment, an individual match game is a simulation game in which the character described above is used. On the other hand, a team match period is a period in which a team match game is played. A team match game is a game that is played by a plurality of users cooperating with each other for an objective. In the present embodiment, a team match game is a game whose objective is that the participating users defeat the opponent by cooperating with each other. Thus, in the combined game mode, users participating in the game (referred to as "participating users") individually play the individual match game during the individual match period, and then play the team match game cooperating with each other during the team match period.

Note that in the present embodiment, all the participating users as a group together battle against the opponent. Note that in other embodiments, the participating users may be divided into a plurality of groups (note that each group includes a plurality of users) so that each group plays the team match game. Where the participating users are divided into a plurality of groups, the team match game may be of a format where the groups battle against each other.

2-1. Process in Pre-Match Period

Figure 5:
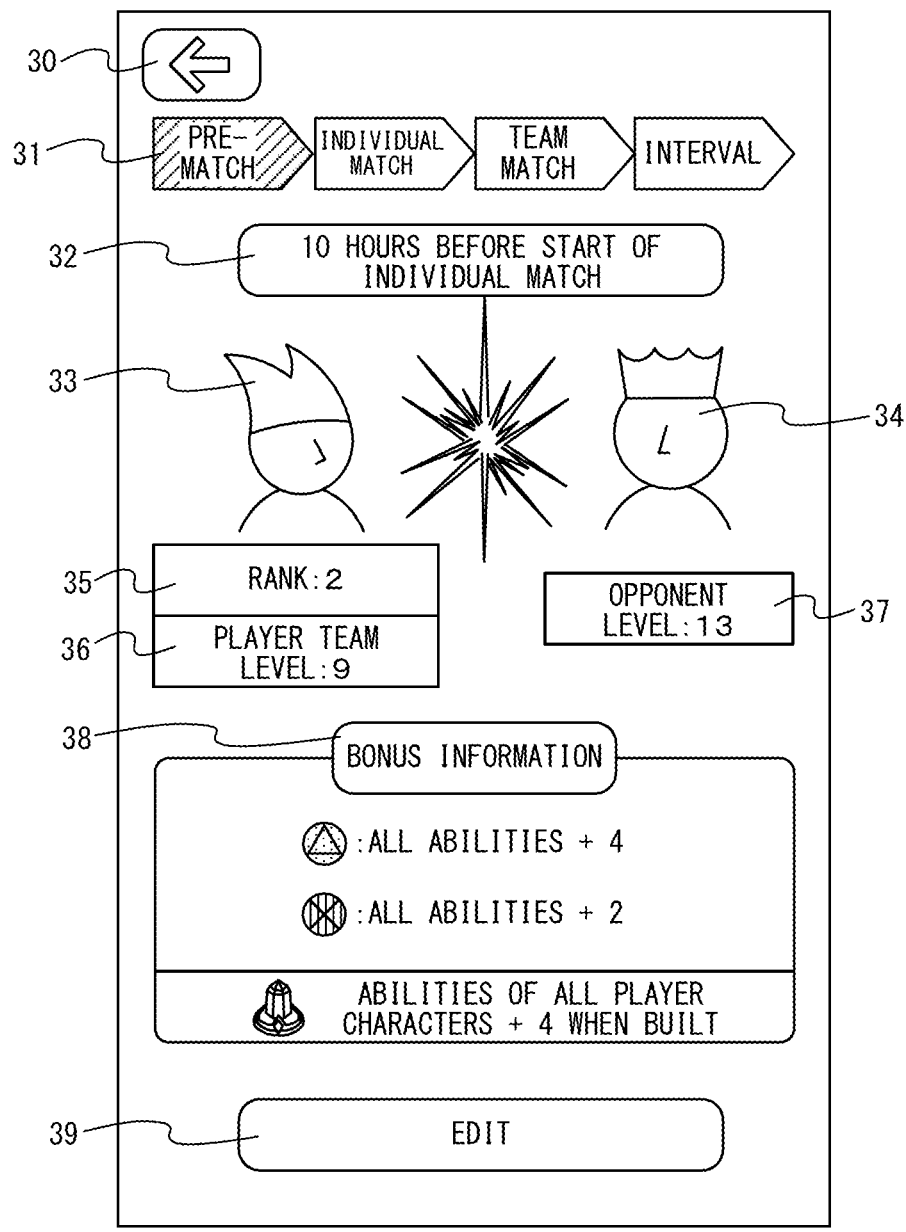
FIG. 5 is a diagram showing an example of a non-limiting pre-match information image that is displayed during a pre-match period.
Figure 6:
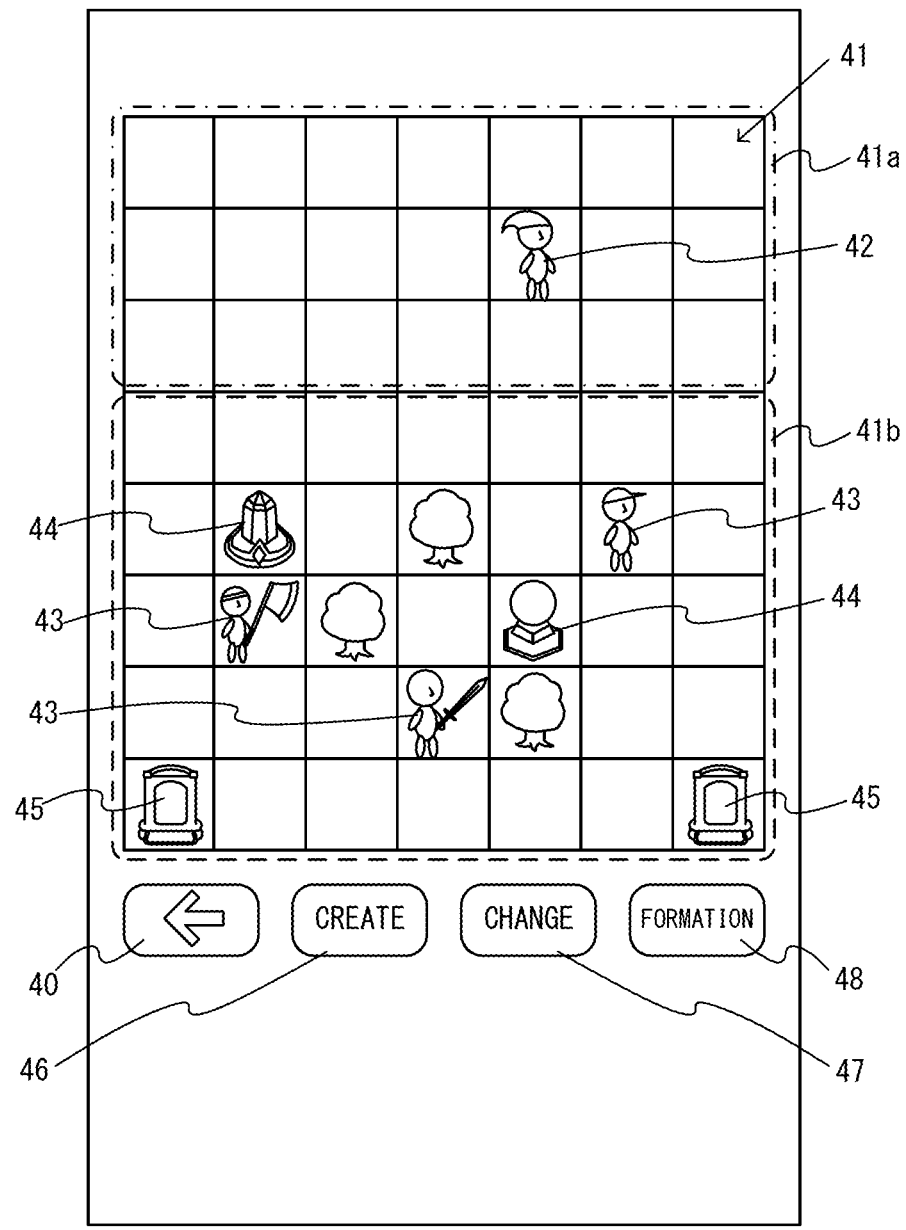
FIG. 6 is a diagram showing an example of a non-limiting edit mode image that is displayed in an edit mode.

Referring to FIG. 5 and FIG. 6, the process in the pre-match period will be described. In the present embodiment, in the pre-match period, the user is notified of information of the individual match game and the team match game. Note that in the present embodiment, the length of the pre-match period (e.g., 48 hours) is set to be longer than the sum (e.g., 45 hours) of the length of the individual match period (e.g., 24 hours) and the length of the team match period (e.g., 21 hours). Thus, where the user starts up the game application to check on the combined game mode at regular intervals, for example, it is possible to reduce the possibility that the user plays the individual match game or the team match game while having missed the information displayed during the pre-match period.

FIG. 5 is a diagram showing an example of a pre-match information image that is displayed during the pre-match period. In the pre-match period, if the combined game mode is started in the game application, the terminal apparatus 2 displays the pre-match information image shown in FIG. 5 on the display section 24. Note that the pre-match information image includes an end button image 30 for giving an instruction to end the combined game mode.

The pre-match information image includes a period image 31. The period image 31 indicates the current point in time being in one of the various periods included in the game period and the interval period. Note that the period image 31 is included in any of the game images for the various periods in the combined game mode. Thus, the user can know the current period by looking at the period image 31.

The pre-match information image includes a remaining time image 32 that represents the remaining time before the start of the individual match period. With the remaining time image 32, the user can know the remaining time until the start of the individual match period.

The pre-match information image includes a player team character image 33 and an opponent character image 34. The player team character image 33 represents a character of the player team in the team match game (e.g., a character to be the leader of the player team troop). The opponent character image 34 represents a character of the opponent team in the team match game (e.g., a character to be the leader of the opponent team troop).

The pre-match information image includes a rank image 35 that represents the rank of the user ("2" in FIG. 5) among the participating users. Although the details will be described later, the rank is an index that represents the rank of the user among the participating users. In the present embodiment, the user is assigned one of 21 ranks, i.e., from Rank 1 to Rank 21. That is, it can be said that the user belongs to one of Rank 1 to Rank 21. Note that ranks may be assigned so that more than one users may belong to a rank, or the participating users may be ranked from top to bottom so that each user is assigned a different rank. In the present embodiment, the rank is set for each of the participating users, and is moved up or down depending on the game result of the user from the individual match game. The pre-match information image includes a player team level image 36 that represents a level ("9" in FIG. 5) that is set for the entire group of participating users. A single player team level is set for the entire group of participating users. The pre-match information image includes an opponent team level image 37 that represents a level of the opponent in the team match game. The method for determining the player team level and the opponent team level will be described later.

The pre-match information image includes a bonus image 38 that represents bonus information. In the present embodiment, the bonus information includes bonus character information and bonus building information. Herein, in the present embodiment, the information processing system sets a bonus character and a bonus building. A bonus character is a character whose abilities are enhanced relative to normal (i.e., when the character is not a bonus character) in the individual match game. A bonus building is a building that, when built on the game map (or "game field") in the individual match game, enhances the abilities of every player character appearing in the individual match game. Therefore, the user can play the individual match game with more advantage by selecting a character that is a bonus character from among characters that can be used by the user and using the character in the individual match game or by placing a bonus building on the game map.

Note that the period in which a particular character is designated as a bonus character (referred to as the "designation period") may be equal to, or different from, one game period. For example, where the ability enhancement for the bonus character is done also in a game mode that is different from the combined game mode, the designation period may be set independently of the game period.

In the present embodiment, the bonus image 38 indicates a mark that represents a bonus character (e.g., a mark that represents an attribute set for the character) and the details of the enhancement for the bonus character ("All abilities+ 4" and "All abilities+2" in FIG. 5). Note that the present embodiment sets two different bonus characters, i.e., a bonus character whose abilities (i.e., the ability values representing the magnitude of the attack power, etc., set for the character) are all increased by 4 and a bonus character whose abilities are all increased by 2. The bonus image 38 indicates an icon that represents a bonus building and the details of the enhancement given to the player character when the bonus building is built ("Abilities of all player characters+4" in FIG. 5).

As described above, in the present embodiment, the user can know bonus information for the next individual match game by starting the combined game mode during the pre-match period, thereby displaying the pre-match information image. Thus, the user can prepare to use a bonus character and a bonus building in the next individual match (specifically, edit on the game map to be described below), and can play the next individual match game with advantage.

The pre-match information image includes an edit button image 39. The edit button image 39 is an image that represents an instruction to start the edit mode for editing the game map in the individual match game. While the pre-match information image is displayed, the terminal apparatus 2 accepts an instruction to start the edit mode (e.g., an input of touching the edit button image 39). Upon receiving the instruction, the information processing system starts the edit mode.

FIG. 6 is a diagram showing an example of the edit mode image that is displayed in the edit mode. In the present embodiment, when the edit mode is started, the terminal apparatus 2 displays the edit mode image shown in FIG. 6 on the display section 24. Note that the edit mode image includes an end button image 40 for giving an instruction to end the edit mode. In response to the instruction, the terminal apparatus 2 ends the display of the edit mode image and displays the pre-match information image again.

As shown in FIG. 6, the edit mode image includes a map image 41 that represents the game map used in the individual match game. In the present embodiment, the game map is an 8×7 grid, and game objects (specifically, characters, buildings and defense buildings) can be arranged in grid boxes. In the example shown in FIG. 6, the game map includes four player characters 42 and 43, two buildings 44 and two defense buildings 45. While the edit mode image is displayed, the terminal apparatus 2 accepts an operation of changing the arrangement of the player characters 42 and 43 and the buildings 44 on the game map (e.g., an operation of dragging a game object to a new position). The arrangement shown by the map image 41 in the edit mode is the initial arrangement at the start of the individual match game. That is, in the present embodiment, the user can edit the initial arrangement at the start of the individual match game in the edit mode.

The four player characters 42 and 43 are those characters that are used in the individual match game, among the characters that can be used by the user. Herein, in the present embodiment, the edit mode image includes a formation button 48 that represents an instruction to change the formation of the player characters used in the individual match game. While the edit mode image is displayed, the terminal apparatus 2 accepts an instruction to change the formation of the player characters (e.g., an input of touching the formation button 48). Upon receiving the instruction, the terminal apparatus 2 displays a character selection image (not shown) and accepts an instruction to select a player character. When the user completes the selection of a player character, the terminal apparatus 2 displays the edit mode image again. On the edit mode image displayed again, the player character selected by the user is arranged on the game map.

Note that in the present embodiment, on the character selection image, the user can select up to four sets of characters, each set including two characters, i.e., a vanguard character and a rearguard character. Note that the vanguard character of each set is displayed on the game map of the edit mode image. At the start of the individual match game, the vanguard character of each set appears. The vanguard character and the rearguard character can be switched in response to a switch instruction from the user during the individual match game. That is, upon receiving a switch instruction from the user, the character, which has been the rearguard, appears on the game map as the vanguard. During the individual match game, when the vanguard character is defeated, the vanguard character disappears and the rearguard character appears on the game map. Then, when the rearguard character is defeated, the characters of the set disappear from the game map.

In the present embodiment, the four sets of player characters appearing on the individual match game are each assigned a role. The player characters of the four sets are each given an ability depending on the role. Specifically, one of the four sets is assigned a role as attacker character. An attacker character is given an ability not to be attacked by an opponent character in the individual match game. The remaining three of the four sets are assigned a role as defender character. A defender character is susceptible to an attack from an opponent character in the individual match game. The three sets of characters to be defenders are each given an ability to enhance a predetermined ability value (e.g., quickness or defense power, etc.) of a plurality of different ability values that are set for characters.

Herein, as shown in FIG. 6, the game map is divided into an attack area 41a and a defense area 41b. On the edit mode image, the player character to be an attacker (the player character 42 in FIG. 6) can be arranged in the attack area 41a and cannot be arranged in the defense area 41b. On the edit mode image, the player characters to be defenders (the player characters 43 in FIG. 6) can be arranged in the defense area 41b and cannot be arranged in the attack area 41a. Note that in the individual match game, attacker and defender player characters can move around on the game map in accordance with instructions from the user. Note that the player character to be an attacker can move in the attack area 41a and cannot move in the defense area 41b. The player characters to be defenders can move in the defense area 41b and cannot move in the attack area 41a.

As described above, in the present embodiment, the information processing system gives a property of not being attacked by an opponent object to one or more game object (e.g., a player character to be an attacker) of game objects of a certain type (e.g., player characters), and allows the game object that is given the property to be arranged on the game map at least on the condition that it is arranged in a partial area (e.g., the attack area) of the game map. Thus, it is possible to improve the playability of the game by improving the strategic aspect of the individual match game. Note that in other embodiments, there is no limitation on the types of game objects to be arranged on the game map. There is no limitation on the property to be given a player character, and a particular property may be not given to a player character.

Each building arranged on the game map has the function of giving an effect on player characters and/or opponent characters in the individual match game, depending on the type of the building. There is no limitation on the details of the effect of a building, e.g., an effect of recovering the hit points of player characters around the building, an effect of strengthening the player characters, an effect of damaging opponent characters around the building, or an effect of weakening the opponent characters. Note that in the present embodiment, the effect of a building is invoked in response to the user giving an instruction to invoke the effect of the building in the individual match game. An instruction to invoke the effect of a building is not accepted for a predetermined number of turns following the invocation of that building (i.e., the user cannot give an instruction again for a predetermined number of turns following the previous issuance of the instruction). Note that there is no limitation on the timing of invoking the effect of a building, and there is no limitation on the period for which an instruction to invoke the building again is not accepted.

As shown in FIG. 6, the edit mode image includes a create button image 46. While the edit mode image is displayed, the terminal apparatus 2 accepts an instruction to create or strengthen a building (e.g., an input of touching the create button image 46). Upon receiving the instruction, the terminal apparatus 2 displays a building creation/strengthening image (not shown) and accepts an instruction to create or strengthen a building. Note that in the present embodiment, the user consumes a predetermined building item used for the creation or the strengthening of a building.

As shown in FIG. 6, the edit mode image includes a change button image 47. While the edit mode image is displayed, the terminal apparatus 2 accepts an instruction to switch a building to be arranged on the game map among all the buildings that have been created (e.g., an input of touching the change button image 47). Note that in the present embodiment, there is an upper limit (e.g., 3) to the number of buildings that can be arranged on the game map. Upon receiving the instruction, the terminal apparatus 2 displays a building change image (not shown) and accepts an instruction to select a building to be arranged on the game map from among all the buildings that have been created. When the user completes the selection of a building, the terminal apparatus 2 displays the edit mode image again. On the edit mode image displayed again, the building selected by the user is arranged on the game map.

As described above, in the present embodiment, the information processing system arranges, based on instructions from the user, a game object of a first type (e.g., a player character) that is controlled by the user and a game object of a second type (e.g., a building) that influences at least one of the game object of the first type and the opponent object, on the game map used in the individual match game. Then, since the user can specify the arrangement of the game objects, it is possible to improve the strategic aspect of the individual match game and to improve the playability of the game. Note that in other embodiments, the game map may be set not based on instructions from the user in the individual match game. For example, the game map may be a fixed game map, or may be set randomly by a program executed in the server 1.

In the present embodiment, the defense buildings 45 are arranged on the game map. The defense buildings 45 are game objects that can be attacked by an opponent character in the individual match game. Specifically, the game is over when the defense buildings 45 are all destroyed in the individual match game. Note that while the arrangement of the defense buildings 45 is not allowed to be changed in the present embodiment, the arrangement of the defense buildings 45 may also be allowed to be changed in the edit mode in other embodiments. There is no limitation on the number of defense buildings arranged on the game map.

As described above, the information processing system sets the pre-match period before the individual match period in a game period, and during the pre-match period in the game period, the information processing system generates a pre-match information image including information of the individual match game and the team match game in that game period. Therefore, in the pre-match period, by referring to the pre-match information image, the user can know the information of the individual match game to be played next (e.g., the rank and bonus information) and the information of the team match game (e.g., the player team level and the opponent team level). In the edit mode, the user can edit the game map to be used in the individual match game.

Note that the information presented to the user by the pre-match information image may include only the information of the individual match game while not including the information of the team match game, or may include only the information of the team match game while not including the information of the individual match game.

Note that in other embodiments, in the pre-match period, the information processing system may present to the user information of a reward of the individual match game (an individual reward to be described below) and/or a reward of the team match game (a common reward to be described below). For example, the pre-match information image may include a button image that represents an instruction to display reward preview image representing the details of the rewards.

2-2. Process in Individual Match Period

Figure 7:
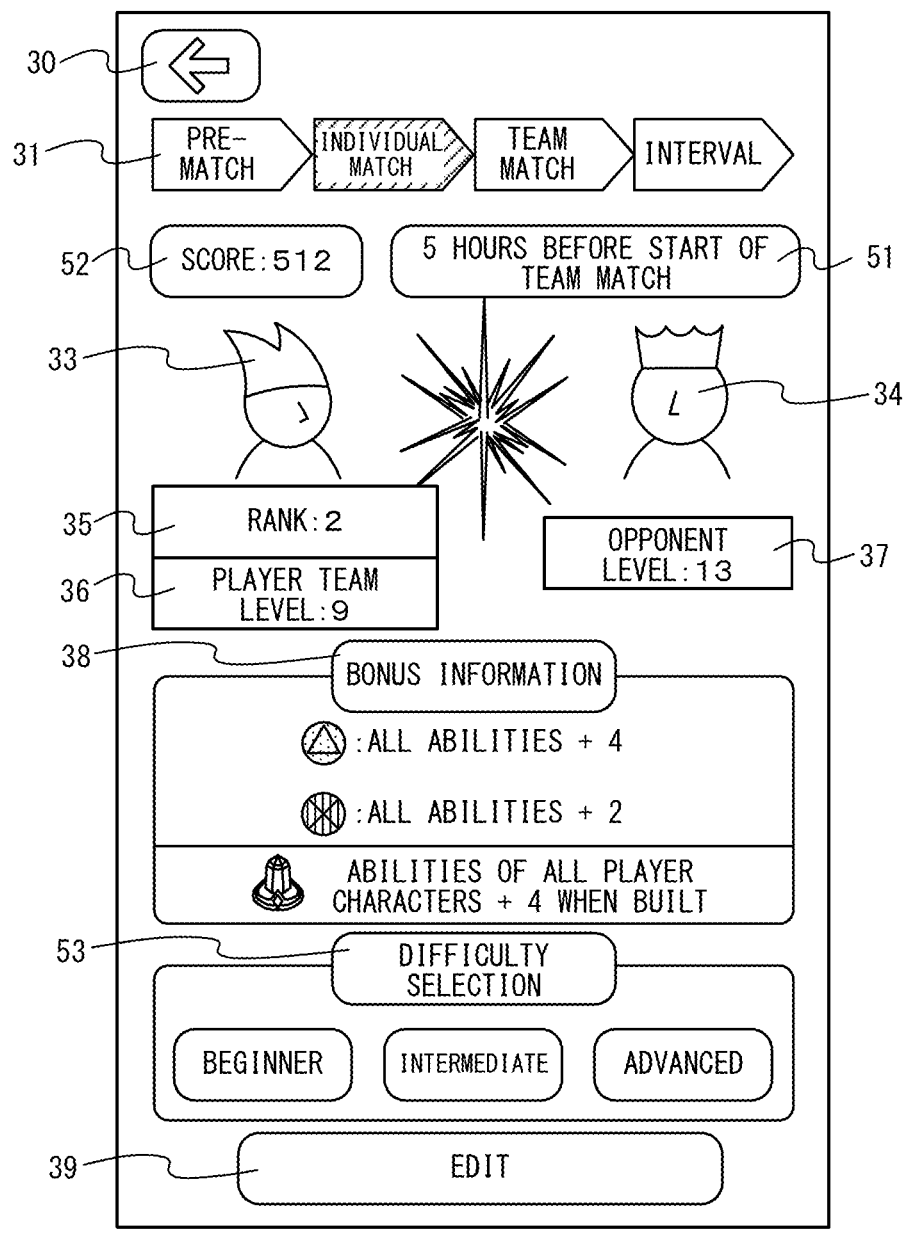
FIG. 7 is a diagram showing an example of a non-limiting individual match information image.

Referring to FIG. 7, the process in the individual match period will be described. In the individual match period, the information processing system executes a process for an individual match game that is played individually by each of the participating users. In the individual match period, when the combined game mode is started in the game application, the terminal apparatus 2 displays an individual match information image on the display section 24.

FIG. 7 is a diagram showing an example of the individual match information image. As does the pre-match information image (refer to FIG. 5), the individual match information image includes the end button image 30 and the period image 31. Note that in the individual match period, the period image 31 indicates the individual match period (refer to FIG. 7).

The individual match information image includes a remaining time image 51 that represents the remaining time before the start of the team match period. With the remaining time image 51, the user can know the remaining time before the start of the team match period.

The individual match information image includes a score image 52 that represents a score ("512" in FIG. 7) achieved by the user in the individual match game during the current individual match period. In the present embodiment, the score is calculated after every individual match game played by the user, and the score represented by the score image 52 is determined based on one or more score or scores calculated in the current individual match period. Hereinbelow, the score represented by the score image 52 may be referred to as "result score" in order to distinguish it from the score for a single individual match game. Although the details will be described later, the result score is used in the team match game. Note that the method for calculating the score and the result score will be described below.

As does the pre-match information image, the individual match start image includes the images 33 to 39. These images 33 to 39 are the same as those included in the pre-match information image, and will not be described in detail below. Note that as does the pre-match information image, the individual match information image may also include a button image that represents an instruction to display the reward preview image.

The individual match information image includes a difficulty selection image 53. The difficulty selection image 53 includes a game start button image for giving an instruction to start the individual match game. In the present embodiment, the individual match game has three levels of difficulty, i.e., beginner, intermediate and advanced. Therefore, the difficulty selection image 53 includes three game start button images corresponding to the three levels of difficulty. While the individual match information image is displayed, the terminal apparatus 2 accepts an instruction to start an individual match game of one of the three levels of difficulty (e.g., an input of touching one of the three game start button images). Upon receiving an instruction to start an individual match game of one of the three levels of difficulty, the information processing system starts the individual match game of the difficulty in accordance with the received instruction. Note that in the present embodiment, the information processing system varies the strength and/or the number of opponent characters depending on the difficulty.

Next, the method for setting opponent characters in the individual match game will be described. In the present embodiment, in addition to setting opponent characters of a strength in accordance with the difficulty, the opponent characters are set so as to have the strength in accordance with the strength of the player characters used in the individual match game. First, the information processing system calculates an assessment value based on the strength of each player character used in the individual match game. While there is no limitation on the method for calculating the assessment value, the assessment value is calculated based on the ability values (e.g., hit points, attack power, defense power, speed, etc.), the skills, the level, etc., of each player character, for example. In the present embodiment, the assessment value for the bonus character described above is corrected to be larger than normal.

Next, the information processing system selects one of the two player characters included in each set of a vanguard and a rearguard, that has a larger assessment value. Then, the sum of assessment values of the four selected player characters is calculated as the team assessment value for the four sets of player characters. The information processing system further corrects the team assessment value based on the rank of the user. For example, the corrected team assessment value is calculated by adding a value in accordance with the rank of the user (specifically, the value is higher for a higher rank) to the uncorrected team assessment value. The team assessment value calculated as described above is used for determining the strength of the opponent characters. Note that there is no limitation on the method for calculating the team assessment value, and it is not limited to the method described above.

The information processing system determines the ability (which can be said to be the strength) of the opponent characters based on the difficulty and the team assessment value. For example, the information processing system determines the ability of the opponent characters (specifically, the level, the ability values, etc., of the opponent characters) based on the team assessment value, and adjusts the level of the opponent characters depending on the difficulty. Note that the information processing system may determine the ability of the opponent characters based on the rank of the user in addition to the difficulty and the team assessment value. For example, the information processing system may correct the ability values of the opponent characters determined as described above by increasing/decreasing the ability values depending on the rank of the user.

When the opponent characters are determined as described above, the information processing system starts the individual match game. In the individual match game, the user plays the game with an objective of defending the defense buildings from the attack by the opponent characters by moving player characters around on the game map and by invoking the effect of a building. In the present embodiment, the game is considered cleared if a predetermined number of turns elapses with a defense building or buildings remaining or if the opponent characters are all defeated. Note that there is no limitation on the details of the individual match game, and the rules of the individual match game are not limited to those described above in other embodiments.

When the user clears the individual match game, the information processing system calculates the score of the individual match game. In the present embodiment, the score is calculated based on the team assessment value, the number of defense buildings destroyed, and the number of player characters defeated. For example, the score is calculated by subtracting a value in accordance with the number of defense buildings destroyed from the team assessment value, and further subtracting a value in accordance with the number of player characters defeated therefrom.

Note that in the present embodiment, there is no limitation on the number of times a user can play the individual match game during the individual match period. That is, the information processing system may allow a user to play the individual match games a plurality of times during the individual match period. The user can play individual match game as many times as possible until the individual match period ends. Note that in other embodiments, the information processing system may have some limitation on the number of times the individual match game can be played. For example, the information processing system may have an upper limit (e.g., 5 times) to the number of times a user can play the individual match game during an individual match period. For example, the information processing system may be configured so that the user is given a predetermined item in the game application, and the user can play the individual match game by consuming the item.

When the score is calculated in the individual match period, the information processing system updates the result score as described above. In the present embodiment, the result score is the highest score among one or more scores calculated in the individual match period. That is, the information processing system updates the value of the result score represented by the score image 52 when the highest score is updated in the individual match period. Note that in other embodiments, the result score may be calculated by any method based on the score of the individual match game in the current individual match period. For example, the result score may be the average value of the scores calculated in the current individual match period.

As described above, in the present embodiment, the result score reflects the team assessment value described above. That is, the information processing system determines a parameter (e.g., the result score) that represents the result of the individual match game for the user based on an ability parameter that represents the ability of the player character used in the individual match game. Note that the ability parameter can be said to be a parameter that can possibly influence the progress of the individual match game (e.g., a parameter such as hit points, attack power, speed or defense power), among the parameters set for the player character. According to the description above, the result score varies depending on the player character used in the individual match game, thereby improving the strategic aspect in conjunction with the selection of the player character, and it is possible to further improve the playability of the game. According to the description above, the user can play the individual match game, hence the team match game, with advantage by having player characters of high abilities. Therefore, it is possible to motivate an advanced user having player characters of high abilities (e.g., a user that has played the game application for a long time) to play the game in the combined game mode.

In the present embodiment, the result score is determined based on the team assessment value reflecting the rank of the user. That is, the information processing system determines a parameter (e.g., the result score) of the user determined in the individual match period of the current game period based on the rank that is determined based on the parameter of the user relating to the individual match game for one or more game periods including at least the previous game period. Thus, the user is more likely to obtain a higher result score by increasing the rank by continuously playing the game in the combined game mode. Thus, in the present embodiment, it is possible to motivate the user to continuously play the game in the combined game mode so that more users participate in the combined game mode. According to the description above, the user can play the individual match game, hence the team match game, with advantage by having player characters of high abilities to enhance the assessment value or by increasing the rank. Therefore, it is possible to motivate an advanced user to play the game in the combined game mode. Note that in other embodiments, the result score may be calculated not based on the team assessment value. The result score may be calculated not based on the result of the individual match game from past game periods, but based on the result from the individual match game in the current game period.

In the present embodiment, the result score varies also depending on whether or not the player character used in the individual match game is a bonus character. That is, the information processing system sets a designation period in which a particular player character is designated (as a bonus character), and in the designation period, the information processing system varies the value of the result score depending on whether or not the player character used in the individual match game is the particular player character that is designated in the designation period. Therefore, in the present embodiment, it is possible to improve the strategic aspect in conjunction with which character is to be used in the individual match game, and it is possible to improve the playability of the game. Note that in other embodiments, the designation period may not be set in the game application, and the bonus character and/or the bonus building may not be set in the game application.

In the present embodiment, the information processing system determines the ability of the opponent object (e.g., an opponent character) appearing in the individual match game based on the ability parameter of the player character. Then, the information processing system can have an opponent character of a strength in accordance with the strength of the player character appearing in the individual match game. Note that in other embodiments, there is no limitation on the method for determining the opponent object, and the type and strength of the opponent object may be determined in advance or may be determined at random.

Next, the method for determining the rank will be described. The rank of the user is determined based on the final result score in one individual match period. In the present embodiment, based on the result score of the user in one individual match period, the rank of the user in the next individual match period is determined. Specifically, the information processing system determines the rank of the user in the next individual match period by increasing, maintaining or decreasing the rank of the user in the current individual match period based on the result score of the current individual match period. For example, the rank of the user is increased for the next individual match period if the place of the result score of the user (specifically, the place of the user among all the users of the same rank) is within a predetermined number of places from the top, and the rank of the user is decreased for the next individual match period if the place of the result score of the user is within a predetermined number of places from the bottom. Note that the increment/decrement of the rank is not limited to one, but the rank may be increased/decreased by two or more. For example, the information processing system may increase the rank of the user by two if the place of the result score of the user is within 10% from the top and may increase the rank of the user by one if the place of the result score of the user is within 20% from the top but not within 10% from the top.

As described above, in the present embodiment, the information processing system determines the rank for each user based on the result of comparison between a parameter (e.g., the result score) of the user and the parameter of another user. Then, although the individual match game, which is individually played by the user, is played in the individual match period, there remains a desirable competition between the participating users, and it is possible to motivate the user to obtain a better result in the individual match game. Therefore, in the present embodiment, the participating users cooperate with each other playing the team match game while the participating users compete against each other in the individual match game, thereby improving the playability of the game as a whole. By determining the rank as described above, it is possible to motivate an advanced user, who is capable of achieve a high rank, to play the game in the combined game mode.

In the present embodiment, the information processing system determines the rank of each user based on a parameter (e.g., the result score) of the user of the individual match game from past game periods. More specifically, the information processing system determines the new rank for each user based on the rank of the user determined based on the parameter of the user for the individual match game from one or more game periods including at least the previous game period (i.e., the rank of the user that is determined after the individual match period of the previous game period), and the result of comparison for the parameter of the user in the current game period. Thus, the rank of the present embodiment reflects the rank of at least the previous game period, and is predisposed to cumulatively reflect the game results from past game periods. Although the details will be described later, in the present embodiment, a parameter that reflects the rank (the attack value to be described below) is used together with the result score in the team match game. Therefore, in the present embodiment, by using the rank, which is predisposed as described above, in the team match game, it is possible to motivate the user to continuously play the game in the combined game mode so that more users participate in the combined game mode.

Note that in other embodiments, there is no limitation on the method for determining the rank, and the rank may be determined based only on the game result of the current game period. For example, the rank may be determined based only on the result score of the current game period.

As described above, in the individual match period, through the individual match game individually played by each participating user, the result score and the rank are determined for each user. Although the details will be described later, in the team match period, the team match game is played by using a parameter (specifically, the attack value) that is calculated based on the result score and the rank.

Note that in other embodiments, the information processing system may present to the user information of a reward of the individual match game also in the individual match period, as in the pre-match period. For example, the individual match information image may include a button image that represents an instruction to display the reward preview image described above.

In the individual match period, the information processing system may present to the user the place of the result score of the user (e.g., the place of the result score of the user among all the users of the same rank). For example, the individual match information image may include a button image that represents an instruction to display a placement preview image for showing the place of the result score the user among all the users of the same rank.

2-3. Process in Team Match Period

Figure 8:
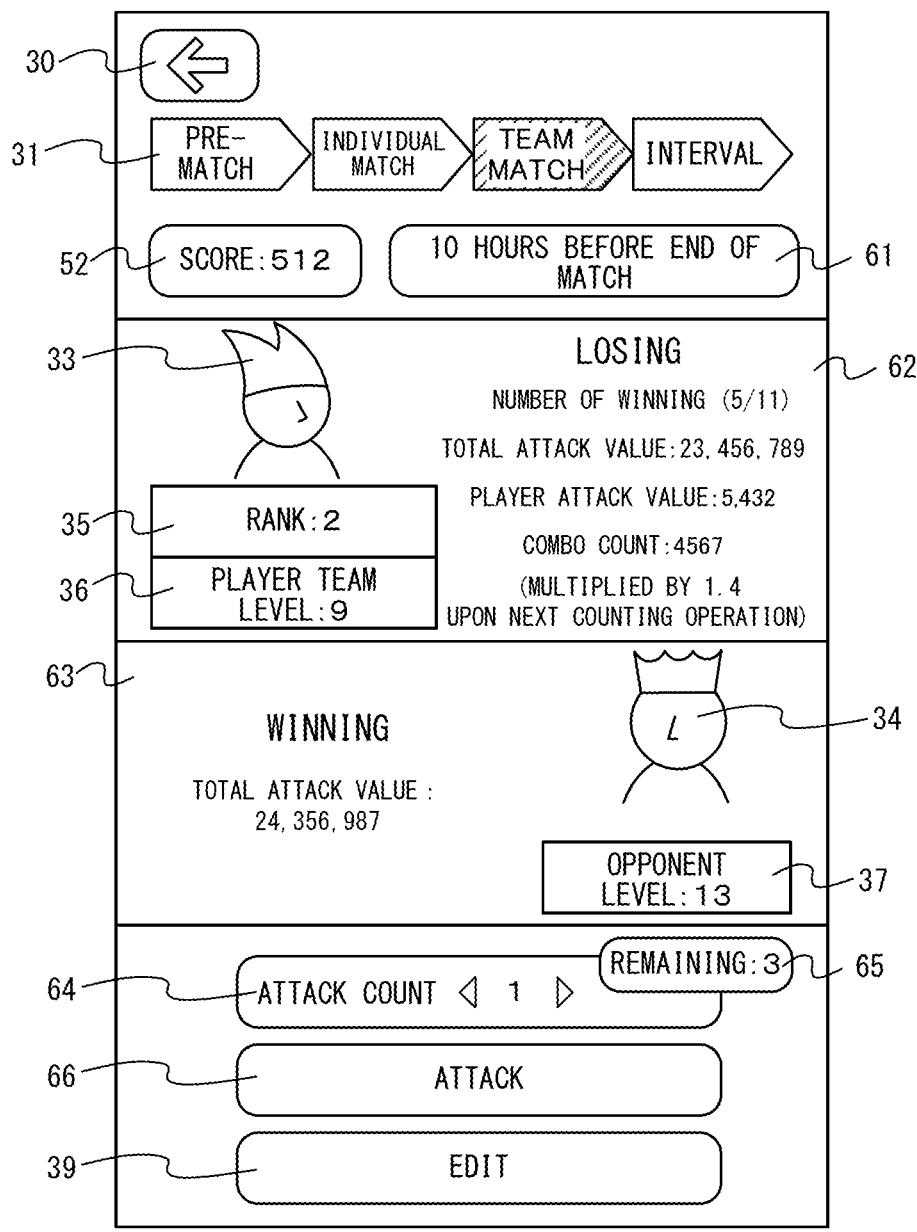
FIG. 8 is a diagram showing an example of a non-limiting team match information image.
Figure 9:
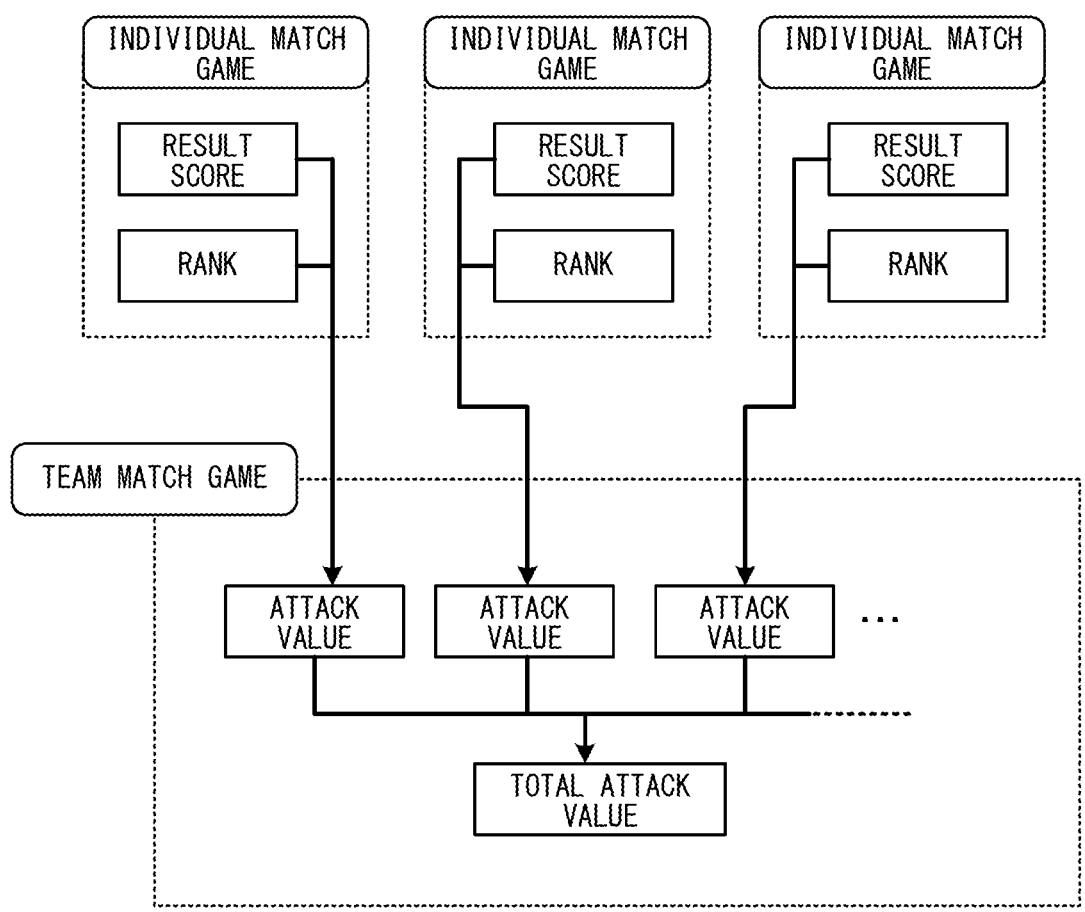
FIG. 9 is a diagram showing an example of a non-limiting method for calculating a total attack value of a player team.
Figure 10:
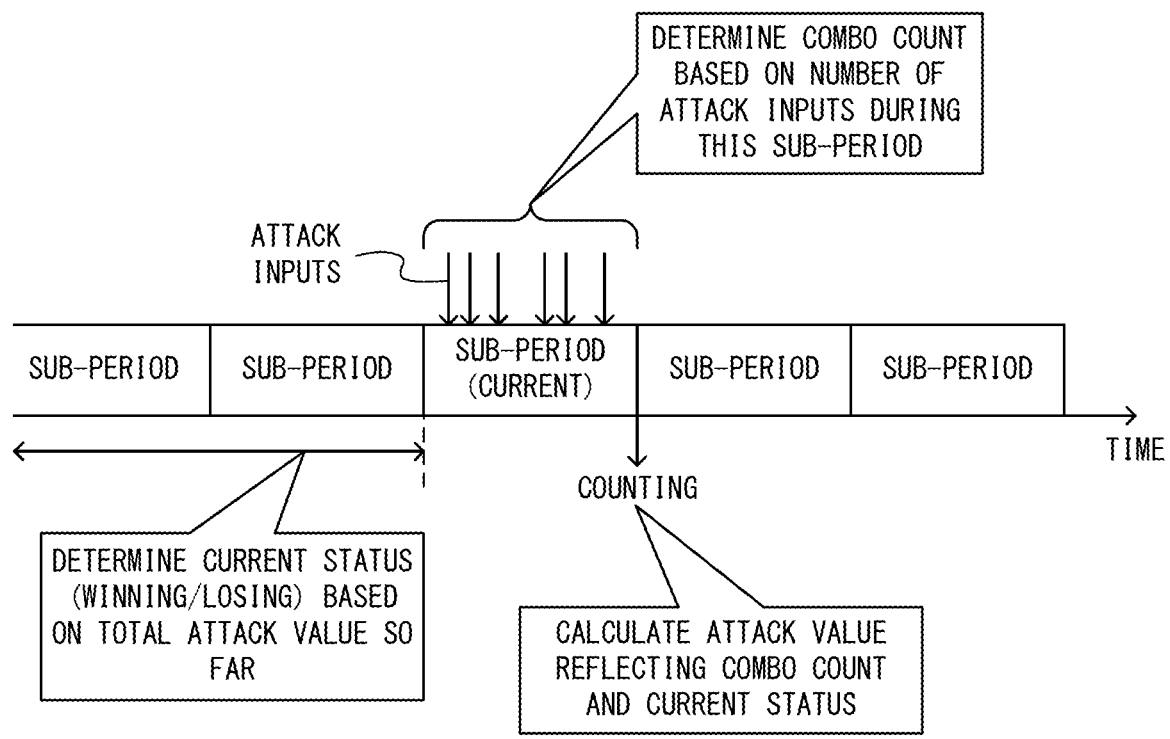
FIG. 10 is a diagram illustrating a non-limiting method for calculating a losing bonus coefficient and a combo bonus coefficient.

Referring to FIG. 8 to FIG. 10, the process in the team match period will be described. In the team match period, the information processing system executes a process for the team match game in which the participating users cooperate with each other. In the team match period, when the combined game mode is started in the game application, the terminal apparatus 2 displays a team match information image on the display section 24.

FIG. 8 is a diagram showing an example of the team match information image. As does the pre-match information image (refer to FIG. 5) and the individual match information image (refer to FIG. 7), the team match information image includes the end button image 30 and the period image 31. Note that in the team match period, the period image 31 indicates the team match period (refer to FIG. 8).

The team match information image includes a remaining time image 61 that represents the remaining time until the end of the team match period. With the remaining time image 61, the user can know the remaining time until the end of the team match period.

Team match information image includes the score image 52 as does the individual match information image. The value represented by the score image 52 in the team match information image is a result score of the individual match game in the current game period (more specifically, the result score at the end of the individual match period).

The team match information image includes a player team information image 62 and an opponent information image 63. The player team information image 62 shows information regarding the player team in the team match game. The player team information image 62 includes the player team character image 33, the rank image 35 and the player team level image 36 described above. The opponent information image 63 shows information regarding the opponent team in the team match game. The opponent information image 63 includes the opponent character image 34 and the opponent team level image 37 described above. Herein, in the present embodiment, in the team match game, points (herein referred to as "total attack value") of the player team are calculated based on attack inputs by the participating users, and the winner/loser is determined based on the result of comparison between the points of the player team and the points of the opponent team. Therefore, the player team information image 62 shows the total attack value of the player team and information of the player team, and the opponent information image 63 shows the total attack value of the opponent team and information of the opponent team.

FIG. 9 is a diagram showing an example of a method for calculating the total attack value of the player team. In the present embodiment, in the team match game, each participating user performs an attack input at any desired timing of the user in the team match period. The information processing system calculates the attack value each time the attack input is performed. Herein, the attack value in accordance with the attack input performed by a user is calculated based on the result score and the rank of the user in the individual match period (refer to FIG. 9). Although the details will be described later, the attack value in the team match game is likely calculated to be higher as the result score and the rank of the user in the individual match game are higher. Then, the total attack value is calculated based on the attack values in accordance with the attack inputs performed by the participating users in the team match period (refer to FIG. 9).

Next, the method for calculating an attack value in accordance with the attack input will be described. In the present embodiment, the attack value is calculated based on the attack count and the losing bonus in addition to the result score and the rank of the user. Specifically, the attack value is calculated by multiplying the result score by the following values.

Attack count

Rank coefficient

Losing bonus coefficient

The values used for calculating the attack value will be described.

(Result Score)

The result score used for calculating the attack value is the result score of the user in the individual match period of the game period. That is, in the present embodiment, the information processing system determines the result score so that the value is higher as the evaluation of the result from the individual match game is better, and determines the attack value so that the participating users have more advantage playing the team match game (e.g., so that the attack value is higher) as the result score is higher. Then, with the information processing system, the team match game can be played while reflecting the result from the individual match game, thereby improving the strategic aspect and the playability of the team match game.

Note that in the present embodiment, a user who has not played the individual match game in the individual match period is allowed to play the team match game. Specifically, the information processing system sets a predetermined value as the result score of a user who has not played the individual match game. While the predetermined value may be any value, it may be set to the value of the lowest score when the individual match game is cleared, for example. Then, it is possible to avoid unfairness that would be felt if a user who has not played the individual match game had advantage over another user whose has played the individual match game.

As described above, in the present embodiment, the information processing system determines the attack value based on the result score of the predetermined value for those users, among the participating users, who have not played the individual match game in the individual match period of the current game period. Thus, even a user who has not played the individual match game can participate in the team match game, and it is possible to increase the number of participants in the team match game. Although the details will be described later, the team match game is a strategic game for the following reason. Because the total attack value varies depending on points in time at which attack inputs are performed by many users, each user observes points in time at which other users perform attack inputs so as to determine an appropriate point in time at which the user performs the attack input. Therefore, by increasing the number of participants in the team match game, it is possible to improve the strategic aspect and improve the playability of the game. Note that in other embodiments, the information processing system may prohibit a user who has not played the individual match game in the individual match period of the current game period from participating in the team match game.

(Attack Count)

The attack count is a number that is specified by the user in the range from one to a predetermined upper limit number. In the present embodiment, the user specifies the attack count when performing the attack input. Note that the upper limit number is the number of times one user can perform the attack input (strictly, an attack input in which the attack count is specified as one) in one team match period. Although there is no limitation on the value of the upper limit number, it is set to three, for example, in the present embodiment. Note that there is no limitation on the method for setting the upper limit number. In other embodiments, a predetermined number of points are given to each user, and the user may be allowed to perform the attack input once by consuming a certain number of points, for example.

As shown in FIG. 8, the team match information image includes an attack count image 64. The attack count image 64 represents the attack count ("1" in FIG. 8) specified by the user. The attack count image 64 includes increase/decrease button images (two triangular symbols in FIG. 8) for giving an instruction to increase/decrease the specified attack count. While the team match information image is displayed, the terminal apparatus 2 accepts an instruction to increase/decrease the attack count (e.g., an input of touching the increase/decrease button image). Upon receiving the instruction, the terminal apparatus 2 updates the attack count represented by the attack count image 64. Thus, the user can change the specified attack count by performing an input on the button image.

The team match information image includes a remaining number of times image 65. The remaining number of times image 65 represents the number of times ("3" in FIG. 8) the user is allowed to perform the attack input in the current team match period. In the example shown in FIG. 8, the remaining number of times image 65 shows 3 times. In this case, the user can perform the attack input while specifying any number from one to three as the attack count. Note that when the attack input is performed, the terminal apparatus 2 updates the display of the remaining number of times represented by the remaining number of times image 65. Then, when the remaining number of times becomes zero, the terminal apparatus 2 no longer accepts the attack input.

The team match information image includes an attack button image 66 that represents an instruction to perform the attack input. While the team match information image is displayed, the terminal apparatus 2 accepts an instruction to perform the attack input (e.g., an input of touching the attack button image 66). Upon receiving the instruction, the terminal apparatus 2 transmits an attack notification to the server 1 that indicates that the attack input has been performed and that indicates the attack count that is specified at the point in time when the instruction is given.

As described above, in the present embodiment, the information processing system sets the upper limit number of times one user is allowed to perform a game input (e.g., an attack input) in the team match period. Then, the information processing system accepts, from the user, an input that specifies a number of times (e.g. the attack count) within an upper limit, together with a game input, in the team match period. When the user performs a game input, the attack value is determined based on the number of times specified by the user and the result score of the user. Thus, by having the user specify the number of times when performing the attack input, it is possible to improve the strategic aspect of the team match game and improve the playability of the team match game.

(Rank Coefficient)

The rank coefficient is set depending on the rank of the user in the individual match period of the game period. In the present embodiment, the rank coefficient is set so as to be higher as the rank is higher. Note that as described above, the rank of each user is updated depending on the game result of the user from the individual match game in the individual match period. In the present embodiment, the rank is updated after the game period. Therefore, the rank used for determining the rank coefficient is the un-updated rank. Note that in other embodiments, the rank may be updated at the end of the individual match period, and the rank coefficient may be set based on the updated rank in the team match period.

(Losing Bonus Coefficient)

The losing bonus coefficient is set based on the determination of the current status of the player team (specifically, whether the player team is winning, losing or even) in the team match game. Specifically, when it is determined that the player team is currently losing, the losing bonus coefficient is set to be greater than 1. On the other hand, when it is determined that the player team is currently winning or even, the losing bonus coefficient is not set. Then, the attack value is calculated without multiplying the result score by the losing bonus coefficient. Note that in the present embodiment, the value of the losing bonus coefficient is a fixed value (e.g., 3) when it is determined that the player team is currently losing. Note that in other embodiments, the information processing system may vary the value of the losing bonus coefficient depending on the degree of losing (e.g., the value of the losing bonus coefficient is set to be higher as the degree of losing is higher). In other embodiments, the information processing system may multiply the result score by a coefficient that is smaller than 1 (instead of the losing bonus coefficient) when it is determined that the player team is currently winning.

In the present embodiment, whether the player team is currently winning or losing is determined for every sub-period in the team match period. FIG. 10 is a diagram illustrating the method for calculating the losing bonus coefficient and the combo bonus coefficient. In the present embodiment, the team match period is divided into a plurality of sub-periods as shown in FIG. 10. For example, the team match period is divided into a plurality of sub-periods of a fixed length (e.g., 1 hour). The information processing system determines whether the player team is currently winning or losing in the current sub-period based on the total attack value of the player team at the start of the current sub-period. Specifically, the information processing system determines that the player team is losing if the total attack value of the player team at the start of the current sub-period is less than the total attack value of the opponent team at the start of the current sub-period by a predetermined amount (e.g., 1% of the total attack value of the opponent team). The information processing system determines that the player team is winning if the total attack value of the player team at the start of the current sub-period is greater than the total attack value of the opponent team at the start of the current sub-period by the predetermined amount. Note that neither of these two cases stand true, the information processing system determines that the teams are even with each other. In the first sub-period of the team match period, no previous total attack value is calculated, and it is therefore determined that the teams are even with each other.

As described above, in the present embodiment, based on the result of comparison between the total attack value of the player team up to a point in time when each sub-period of the team match period ends and the reference value (e.g., the total attack value of the opponent team up to this point in time), the information processing system determines the attack value in accordance with game inputs (e.g., attack inputs) that are performed in a sub-period after this point in time. Thus, the attack value is determined in accordance with the status so far in the team match period. For example, it is possible to make an adjustment such that there will not be a significant difference between the total attack value of the player team and the total attack value of the opponent team so that the match is likely to be close. Thus, it is possible to improve the playability of the team match game. Note that in other embodiments, no sub-periods may be set for the team match period, and the total attack value does not need to be calculated at the end of each sub-period.

In the present embodiment, the attack value for each attack input calculated as described above is corrected by using the combo bonus coefficient. Then, the corrected attack values are added together, thus obtaining the total attack value of the player team. The combo bonus coefficient is set based on the combo count in the current sub-period. Herein, the combo count is the number of times the attack input is performed by the participating users in the sub-period (refer to FIG. 10). Note that if the attack count specified by the user at the time of an attack input is more than one, the information processing system counts the attack count of the attack input as being the number specified by the user for the purpose of counting the combo count. For example, if 1000 attack inputs are performed, of which the specified attack count is 2, during one sub-period, the combo count for the sub-period is 1000×2=2000. In the present embodiment, the combo bonus coefficient is set to be larger as the combo count is higher. Therefore, if more users perform the attack input during a sub-period, the attack value of each attack input itself is likely to be high.

Thus, in the present embodiment, the combo count and the combo bonus coefficient can be calculated after the end of the current sub-period. The attack value corrected based on the combo bonus coefficient can also be calculated after the end of the current sub-period. Therefore, in the present embodiment, the information processing system calculates the combo count by counting the attack inputs performed during the current sub-period at the end of the sub-period. The information processing system corrects the attack values (which are based on the respective attack inputs performed during one sub-period) based on the combo bonus coefficient (and the current status, etc.) of the sub-period after the end of the sub-period (more specifically, following the end of the sub-period) (refer to FIG. 10). For example, a corrected attack value is obtained by multiplying an uncorrected attack value by the combo bonus coefficient. Thus, in the present embodiment, corrected attack values of one sub-period are calculated together at the end of the sub-period. Note that uncorrected attack values may be calculated each time an attack input is performed or may be calculated together at the end of the sub-period.

Note that in the present embodiment, when an attack input is received during the team match period, the terminal apparatus 2 displays a game image in which a player character (e.g., the player character used in the individual match game) attacks the opponent team troop. At this point, the attack value in accordance with the attack input may be calculated and the attack value may be displayed as the amount of damage on the opponent team troop. Then, the information processing system can give the user a general idea of the magnitude of the attack value based on the attack input without having to wait until the end of the sub-period.

Each time a sub-period ends, the information processing system calculates the total attack value up to the end of the sub-period. Specifically, the information processing system calculates the sum of the corrected attack values for the sub-period, and adds the calculated sum to the total attack value. The total attack value calculated at the end of the last sub-period of the team match period is the final total attack value of the team match game.

As described above, the information processing system determines the total attack value of the player team based on the total number of times the game input (e.g., the attack input) has been performed by a plurality of users within a sub-period. After the end of a sub-period, the information processing system determines the total attack value based on attack values in accordance with game inputs that have been performed by a plurality of users in the sub-period. Then, the total attack value of the player team based on the game input performed by a user varies depending on the number of times the game input has been performed by other users in the sub-period. Therefore, the user determines when to perform the game input by predicting how much the game input may be performed by other users in the sub-period. Thus, it is possible to improve the strategic aspect in conjunction with when to perform the game input, and to improve the playability of the team match game.

In the present embodiment, the information processing system updates the total attack value of the player team and updates the total attack value of the opponent team at the end of the sub-period. Specifically, the information processing system calculates the amount of addition in the sub-period, and adds the amount of addition to the total attack value of the opponent team. There is no limitation on the method for calculating the amount of addition, and the amount of addition may be determined based on a random number so as to have randomness within a predetermined range, for example. There is no limitation on the method for calculating the total attack value of the opponent team. For example, the total attack value of the opponent team may be calculated to be larger as the opponent team level is higher. Then, by referring to the opponent team level, the user can to some degree estimate the strength (specifically, the total attack value) of the opponent team. For example, in other embodiments, a team match game may be played, in which the participating users are divided into two groups so that the groups battle against each other. Then, the total attack value of the opponent team may be calculated by the same method as the total attack value of the player team.

Now, the player team information image 62 described above includes information as follows (refer to FIG. 8).
  Current status of player team in current sub-period ("Losing" in FIG. 8)
  Number of "winning" decisions for player team over total number of sub-periods so far ("5/11" in FIG. 8)
  Current total attack value of player team
  User's attack value (total attack value of the user himself/herself)
  Combo count and combo bonus coefficient ("1.4" in FIG. 8) at current point in time in current sub-period Note that the combo count displayed in the player team information image 62 represents the combo count at the current point in time, i.e., the total number of times the attack input has been performed up to the current point in time since the start of the current sub-period. Therefore, the combo count displayed in the player team information image 62 can be said to be a temporary value at the current point in time, and may be a different value from the combo count at the end of the current sub-period. The combo bonus coefficient displayed in the player team information image 62 is determined based on the combo count at the current point in time. Therefore, the combo bonus coefficient displayed in the player team information image 62 may be a different value from the combo bonus coefficient at the end of the current sub-period. Note that even the combo count and the combo bonus coefficient at the current point in time as described above can be a basis for decision by the user whether or not to perform the attack input. The opponent information image 63 described above includes information representing the current status of the opponent team in the current sub-period and information representing the current total attack value of the opponent team (refer to FIG. 8).

Note that in the present embodiment, if the player team wins in a team match game, the information processing system increments the player team level described above by one. Moreover, if the player team wins in a team match game and if the number of times the player team has been decided "winning" in sub-periods, the information processing system further increments the player team level by one. Therefore, in the present embodiment, it is possible to increase the combo bonus coefficient and thus to increase the total attack value of the player team if many users perform the attack input in one sub-period. However, if too many attack inputs are performed in one sub-period, there will be few attack inputs in other sub-periods, possibly lowering the total number of "winning" decisions for the player team. Therefore, referring to the various information presented by the player team information image 62, each user can determine whether or not to perform the attack input in the current sub-period, and can determine the attack count if the user decides to perform the attack input.

As described above, in the present embodiment, the information processing system determines a parameter for each game input for determining the total attack value of the player team (e.g., the attack value reflecting the losing bonus coefficient or the attack value corrected by combo bonus coefficient) in accordance with the point in time within the team match period at which the game input (e.g., the attack input) is performed. Thus, even if the team match game is played with a simpler game input than in the individual match game, it is possible to give a strategic aspect to the team match game, and to improve the playability of the team match game.

Note that in the present embodiment, the game for determining the attack value of each user is such a game that the game result thereof reflects the user's play skills and strategical skills, and the strength of the character or characters owned by the user (i.e., whether the user owns a strong character or characters). For example, in the present embodiment, the attack value of each user is determined based on the game result of the individual match game described above. Herein, if the user were to play an individual match game during a team match period, since an individual match game takes some time from start to finish, the sub-period might transition to another from start to finish of the game.

Then, the user may possibly fail to perform the attack input in an intended sub-period, and the user may then feel that the user has missed an opportunity to perform the attack input at desired timing. In view of this, in the present embodiment, the user plays the individual match game, which takes some time, before the team match period, and the user only performs a simple attack input that does not take a long time during the team match period. In the present embodiment, the team match game can be said to be a game that can be completed with fewer inputs than the number of inputs that is required for completing the individual match game. Thus, it is possible to reduce the possibility that the sub-period may transition to next while performing the attack input, and it is possible to improve the selectivity for the attack input by the user. In the present embodiment, it is possible to improve the selectivity for the team match game while the skills, the strategy, etc., of the user are reflected in the team match game.

After the team match period ends and the winner/loser of the team match game is determined, the information processing system updates the rank of each participating user and the player team level as necessary. As described above, the rank is updated based on the result score of the user. The player team level is updated based on the win/loss of the team match game and the current status for each sub-period (specifically, the number of times the player team has been decided "winning").

After the team match period ends, the information processing system gives the participating users a reward based on the game in the current game period. In the present embodiment, the information processing system gives each participating user an individual reward based on the game result of the individual match game for the user and a common reward based on the game result (common among the participating users) of the team match game. Note that the reward to be given is a reward in the game in the game application (e.g., an item, a character or additional content, etc.), and there is no particular limitation on the details of the reward. Note that the reward may be a reward that can be used in the combined game mode or may be reward that can be used in a game mode of the game application other than the combined game mode. In other embodiments, the user may be given only one of an individual reward and a common reward, or the user may be given no reward based on the result in the team match game mode.

In the present embodiment, the individual reward given to the user is determined based on the rank of the user. Specifically, the information processing system gives the user an individual reward based on the rank, which has been updated based on the result of the individual match game in the current game period. That is, users belonging to the same rank are given the same individual reward. By giving an individual reward as described above, it is possible to motivate the user to obtain a good game result not only in the team match game but also in the individual match game. By giving an individual reward based on the game result of each individual user, it is possible to motivate an advanced user who is likely to obtain a good game result (e.g., a user who has been playing the game application for a long time) to play a game in the combined game mode.

In the present embodiment, the information processing system determines an item used for creating or strengthening a building described above ("building item" described above) as an individual reward. For example, the information processing system determines an individual reward so that more building items are given to users of a higher rank. When a building item is given as an individual reward as described above, the user who is given the individual reward can create or strengthen a building using the building item so as to make the game map more advantageous for the user. Thus, it is possible to motivate the user to repeatedly play the individual match game, and it is possible to motivate the user to continuously play the game in the combined game mode.

In the present embodiment, the common reward is determined based on the player team level, which is common among the participating users. Specifically, the information processing system gives users a common reward based on the player team level, which has been updated based on the result of the team match game in the current game period. Since the common reward is a reward of which the details are common among the participating users, even a beginner user (e.g., a user who has just started playing the game application) can receive the same reward as an advanced user. Thus, it is possible to motivate a beginner user to play the game in the combined game mode.

As described above, in the present embodiment, an individual reward and a common reward are given to each participating user, and it is possible to motivate a wide variety of users to play the game in the combined game mode. Thus, it is possible to increase the number of participating users, and it is possible to improve the playability of the combined game mode.

Note that in the present embodiment, the information processing system excludes users who have not performed the game input (e.g., the attack input) in the team match period from the group of users who are given a common reward. If a common reward were to be given also to such users, users would lose an incentive to play the team match game, which then might lower the playability of the team match game, of which the playability improves as more users participate. While a common reward means a reward to be given of which the details are common among participating users as described above, a common reward does not always need to be given to all the users. Note that in other embodiments, the information processing system may give a common reward also to users who have not performed the game input in the team match period.

In the present embodiment, the information processing system evaluates (e.g., determines the current status described above) the team match game based on the total attack value of the player team for each of a plurality of sub-periods, and determines the player team level based on the evaluation. Then, the details of the common reward are determined based on the player team level. Thus, in the present embodiment, the information processing system determines the common reward based on the evaluation in each sub-period. Thus, it is possible to direct each user's attention not only to the result of the team match game but also to the in-progress game status of the team match game, and it is therefore possible to further improve the playability of the team match game.

Note that in the present embodiment, the game result of each user (e.g., the user's attack value described above) in the team match game is not reflected in the details of the reward. Herein, it is believed that in the team match game, many users play the game with an objective of defeating the opponent by cooperating with other participating users. However, if a reward based on the game result of each user in the team match game were to be given, some users might possibly play the game with an objective of achieving a good game result only for themselves (e.g., increasing their attack values while not increasing the attack values of other users), rather than achieving a good game result for the participating users as a whole (e.g., increasing the total attack value). Then, the playability of the team match game may lower for those users who want to play the game by cooperating with other participating users. For example, if some users were to perform the attack input only when the player team is losing so that the losing bonus coefficient is applied to their attack values, the player team would unlikely be decided "winning" and would likely lose in the team match game as a result. In contrast, in the present embodiment, a reward based on the game result of each user is not given in the team match game, thereby reducing the possibility that playability of the team match game might lower for the reason described above.

In other embodiments, the information processing system may present to the user information of a reward also in the team match period as in the pre-match period. For example, the team match information image may include a button image that represents an instruction to display the reward preview image described above.

As described above, in the present embodiment, the information processing system sets the rank for each user or calculates the result score based on the assessment value in the individual match game, thereby motivating advanced users to participate in the individual match game. Note that only with such an individual match game, beginner users may feel intimidated to participate in the game in the combined game mode, thereby reducing the number of participating users in the combined game mode. In contrast, in the present embodiment, beginner users are encouraged to participate in the combined game mode by employing an attack input that can be performed in a simple manner (in other words, the game can be completed in a short amount of time) or by employing a common reward to be given to participating users in the team match game. Therefore, according to the present embodiment, it is possible to motivate a wide variety of users from beginners to advanced users to participate in the combined game mode, and it is possible to increase the number of participating users. Thus, it is possible to improve the playability of the game in the combined game mode.

2-4. Process in Interval Period

Next, the process in the interval period will be described. In the interval period, the information processing system executes a process in which the user claims a reward that has been given to the user in the game in the combined game mode (e.g., a process of converting the item given to the user to such a state that the item can be used in the game application). For example, the terminal apparatus 2 displays a list of rewards that have been given to the user on the display section 24, converts a reward specified by the user to such a state that the reward can be used in the game application. Note that this process may be able to be executed not only in the interval period but also in the game period.

In the information processing system, the edit mode described above can be used also in the interval period. For example, in the interval period, the terminal apparatus 2 displays the edit button image 39 described above on the display section 24, and starts the edit mode in response to an instruction from the user.

3. Specific Example of Process Performed in Information Processing System

Next, referring to FIG. 11 to FIG. 19, a specific example of the information process performed in the information processing system will be described.

3-1. Data Used in Information Process

Figure 11:
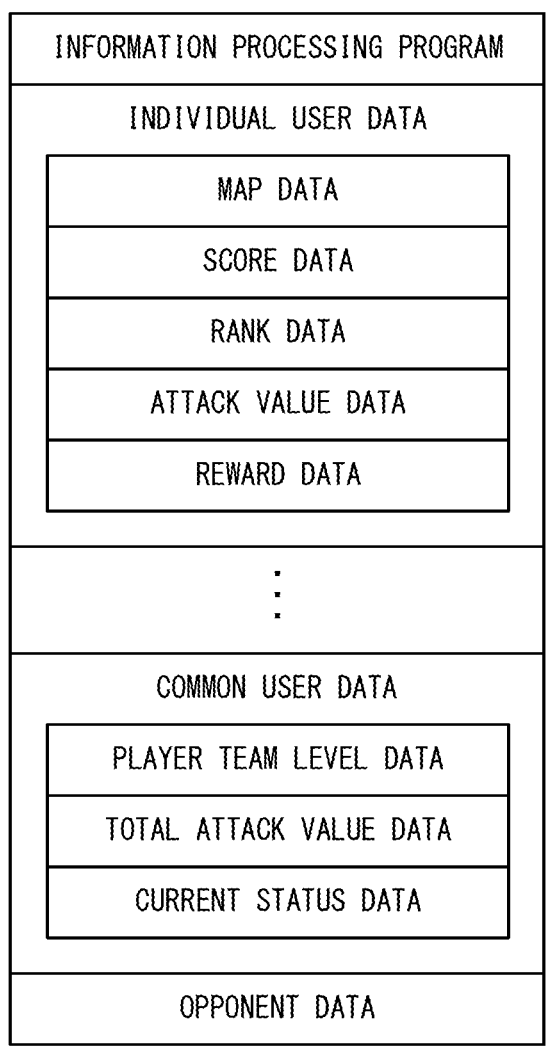
FIG. 11 is a diagram showing an example of various data used in information processes performed in a non-limiting information processing system.

FIG. 11 is a diagram showing an example of various data used in information processes performed in the information processing system. Data shown in FIG. 11 are stored in, for example, the storage section 12 of the server 1 (or the memory of the processing section 11).

As shown in FIG. 11, the server 1 stores an information processing program for executing the game application described above. As the processing section 11 of the server 1 executes the information processing program described above, the server process to be described below (refer to FIG. 12 to FIG. 15) is executed in the server 1.

As shown in FIG. 11, the server 1 stores individual user data representing information of individual users. The server 1 stores individual user data for each of the participating users described above. In the present embodiment, the individual user data includes map data, score data, rank data, attack value data and reward data. Note that the individual user data may include the various data above, and also includes various data relating to the user (identification information of the user, characters owned by the user, items owned by the user, etc.).

The map data represents the game map used in the individual match game. In the present embodiment, map data representing a game map that has been edited by the user in the edit mode described above is stored. The score data represents the result score described above. The rank data represents the current rank of the user. The attack value data represents an attack value for each attack input calculated in the team match game. The reward data represents rewards that have been given to the user.

As shown in FIG. 11, the server 1 stores common user data representing information that is common among the participating users. In the present embodiment, the common user data includes player team level data, total attack value data and current status data. The player team level data represents the current player team level. The total attack value data represents the current total attack value of the player team. The current status data represents the current status for each sub-period.

The server 1 also includes opponent data representing information regarding the opponent in the team match game. In the present embodiment, the opponent data includes data representing the opponent team level described above, and data representing the total attack value of the opponent team.

3-2. Process in Server

Figure 12:
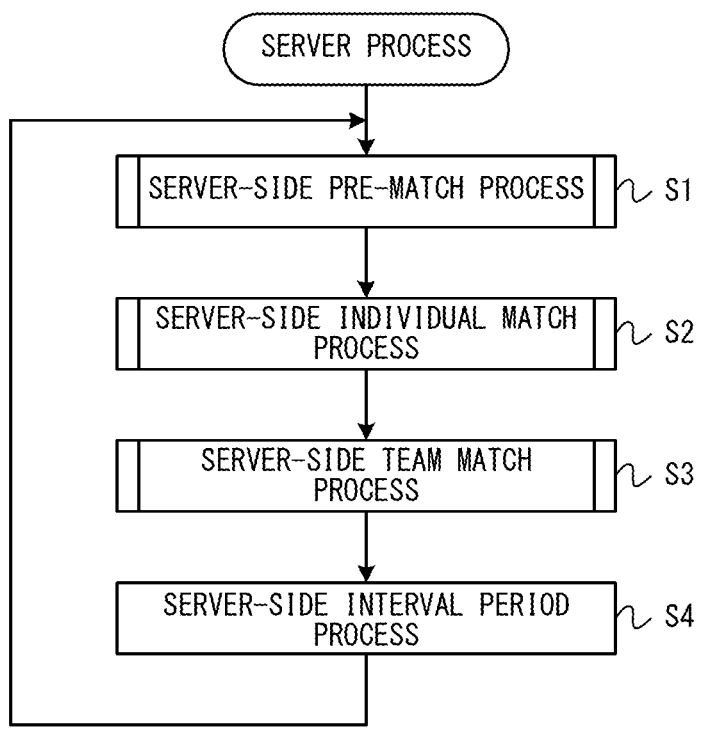
FIG. 12 is a flow chart showing an example of a flow of a server process that is executed by a non-limiting server.

FIG. 12 is a flow chart showing an example of a flow of a server process that is executed by the server 1. Note that the series of server processes shown in FIG. 12 is continuously executed while the server 1 is in operation.

Note that in the present embodiment, it is assumed that the CPU (in other words, a processor) of the processing section 11 or 21 of the server 1 or the terminal apparatus 2 executes a program stored in the storage section 12 or 22, thereby executing processes of the steps shown in FIG. 12 to FIG. 19. Note that in other embodiments, some of the processes of the steps described above may be executed by another processor (e.g., a dedicated circuit, or the like) different from the CPU. Where the server 1 and the terminal apparatus 2 can communicate with each other, some of the processes of the steps shown in FIG. 12 to FIG. 15 may be executed in the terminal apparatus 2, and some of the processes of the steps shown in FIG. 16 to FIG. 19 may be executed in the server 1. The processes of the steps shown in FIG. 12 to FIG. 19 are merely illustrative, and the order of steps to be performed may be switched around or other processes may be executed in addition to (or instead of) the processes of the steps, as long as similar results are obtained.

The processing section 11 of the server 1 executes the processes of the steps shown in FIG. 12 to FIG. 15 using a memory (or the storage section 12). That is, the CPU of the processing section 11 stores data obtained in the process steps in the memory, and reads out and uses the data from the memory in subsequent process steps as necessary. Similarly, the processing section 21 of the terminal apparatus 2 executes the processes of the steps shown in FIG. 16 to FIG. 19 using a memory (or the storage section 22). That is, the CPU of the processing section 21 stores data obtained in the process steps in the memory, and reads out and uses the data from the memory in subsequent process steps as necessary.

In the server process shown in FIG. 12, in step S1, the processing section 11 executes a server-side pre-match process. The server-side pre-match process is a process executed on the server side in the pre-match period described above. In the server-side pre-match process, the processing section 11 executes a process of transmitting, to the terminal apparatus 2, information that is presented to the user on the pre-match information image, and saving the game map that has been edited in the edit mode. The details of the server-side pre-match process will be described below (refer to FIG. 13). The process of step S2 is executed, following step S1.

In step S2, the processing section 11 executes the server-side individual match process. The server-side individual match process is a process executed in the individual match period described above. In the server-side individual match process, the processing section 11 executes a process of transmitting, to the terminal apparatus 2, information that is presented to the user on the individual match information image, and receiving the game result of the individual match game from the terminal apparatus 2. The details of the server-side individual match process will be described below (refer to FIG. 14). The process of step S3 is executed, following step S2.

In step S3, the processing section 11 executes the server-side team match process. The server-side team match process is a process that is executed in the team match period described above. In the server-side team match process, the processing section 11 executes a process of transmitting, to the terminal apparatus 2, information that is presented to the user on the team match information image, and advancing the team match game based on the attack input by the user. The details of the server-side team match process will be described below (refer to FIG. 15). The process of step S4 is executed, following step S3.

In step S4, the processing section 11 executes the server-side interval period process. The server-side interval period process is a process that is executed in the interval period described above. In the server-side interval period process, the processing section 11 executes a process of transmitting, to the terminal apparatus 2, information that represents a list of rewards that have been given to the user in response to a request from the terminal apparatus 2, and allowing the user to claim the rewards. The processing section 11 manages the start and the end of the designation period described above. For example, in response to the arrival of a predetermined point in time (real time), the processing section 11 ends a designation period in which a certain character is designated as a bonus character, and starts a designation period in which another character different from the certain character is designated as a bonus character. Thus, the processing section 11 switches bonus characters over time. The process of step S1 is executed again, following step S4.

As described above, in the server process, the server-side pre-match process (step S1), the server-side individual match process (step S2), the server-side team match process (step S3) and the server-side interval period process (step S4) are executed repeatedly. The processing section 11 transitions through these periods over time (real time). That is, the processing section 11 manages the start and the end of each period based on real time. Specifically, in response to the arrival of a point in time (real time) at which the process step of one of steps S1 to S4 should be ended (that is, the arrival of the end of the period corresponding to the process step), the processing section 11 ends the process step and starts the next process step. Thus, in the present embodiment, the game period and the interval period are managed by the server 1.

Figure 13:
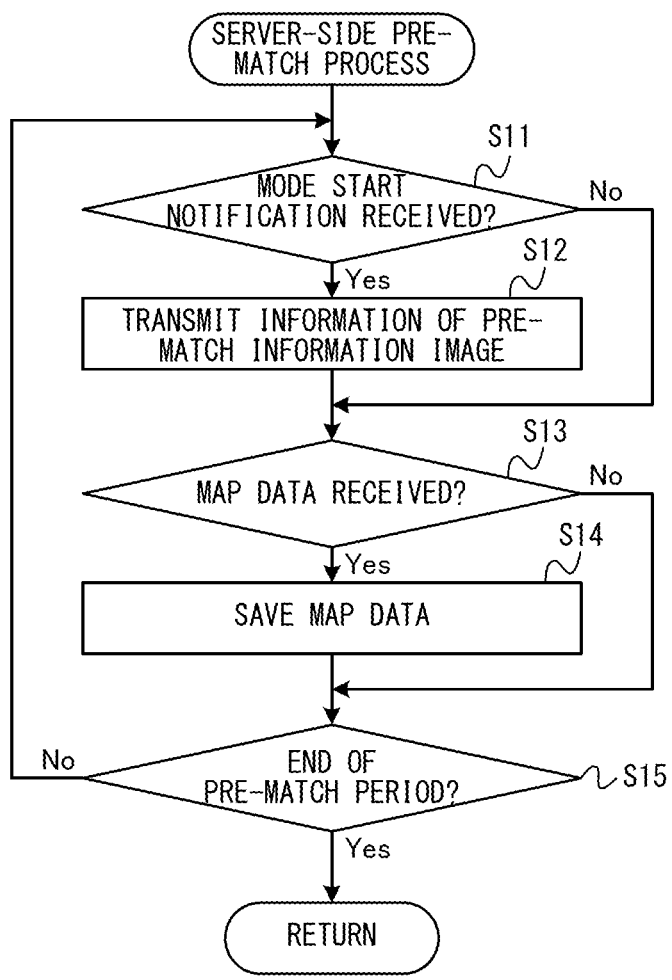
FIG. 13 is a sub-flow chart showing an example of a detailed flow of a non-limiting server-side pre-match process of step S1 shown in FIG. 12.

FIG. 13 is a sub-flow chart showing an example of a detailed flow of the server-side pre-match process of step S1 shown in FIG. 12. In the server-side pre-match process, first, in step S11, the processing section 11 determines whether a mode start notification has been received from the terminal apparatus 2 via the communication section 13. Note that when the combined game mode is started, the terminal apparatus 2 transmits a mode start notification to the server 1 (step SM to be described below). When the determination result of step S11 is affirmative, the process of step S12 is executed. On the other hand, when the determination result of step S11 is negative, the process of step S13 is executed while skipping the process of step S12.

In step S12, the processing section 11 transmits information that is presented to the user on the pre-match information image to the terminal apparatus 2 that has transmitted the mode start notification, via the communication section 13. For example, the processing section 11 transmits to the terminal apparatus 2 information regarding the remaining time before the start of the individual match period, the rank of the user, the player team level, the opponent team level and the bonus information. The process of step S13 is executed, following step S12.

In step S13, the processing section 11 determines whether map data has been received from the terminal apparatus 2 via the communication section 13. Note that when the game map is edited through the edit mode in the terminal apparatus 2, the terminal apparatus 2 transmits map data representing the edited game map to the server 1 (step S65 to be described below). When the determination result of step S13 is affirmative, the process of step S14 is executed. On the other hand, when the determination result of step S13 is negative, the process of step S15 is executed while skipping the process of step S14.

In step S14, the processing section 11 saves the map data received from the terminal apparatus 2. That is, the processing section 11 stores the received map data in the memory as map data that is included in the individual user data for the user of the terminal apparatus 2 that has transmitted the map data. The process of step S15 is executed, following step S14.

In step S15, the processing section 11 determines whether or not to end the server-side pre-match process. For example, the processing section 11 determines whether a point in time at which the pre-match period should be ended has arrived (or whether a predetermined length of time has elapsed since the start of the pre-match period). When the determination result of step S15 is negative, the process of step S1*l* is executed again. Thereafter, the series of processes of steps S11 to S15 is executed repeatedly until it is determined to end the server-side pre-match process. On the other hand, when the determination result of step S15 is affirmative, the processing section 11 ends the server-side pre-match process and starts the server-side individual match process (step S2).

Figure 14:
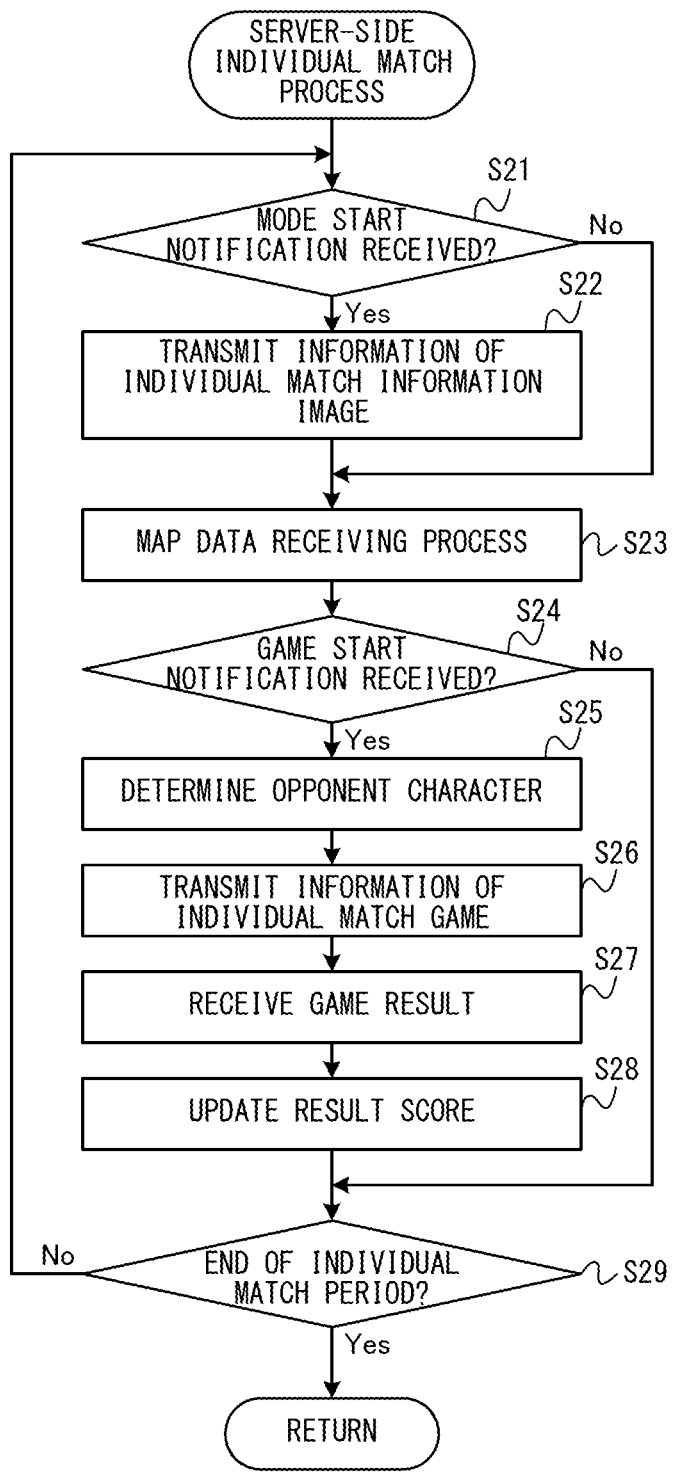
FIG. 14 is a sub-flow chart showing an example of a detailed flow of a non-limiting server-side individual match process of step S2 shown in FIG. 12.

FIG. 14 is a sub-flow chart showing an example of a detailed flow of the server-side individual match process of step S2 shown in FIG. 12. In the server-side individual match process, first, in step S21, the processing section 11 determines whether a mode start notification has been received from the terminal apparatus 2 via the communication section 13. When the determination result of step S21 is affirmative, the process of step S22 is executed. On the other hand, when the determination result of step S21 is negative, the process of step S23 is executed while skipping the process of step S22.

In step S22, the processing section 11 transmits information that is presented to the user on the individual match information image to the terminal apparatus 2 that has transmitted the mode start notification, via the communication section 13. For example, the processing section 11 transmits to the terminal apparatus 2 information regarding the remaining time before the start of the team match period, the rank of the user, the player team level, the opponent team level, the bonus information and the result score. The process of step S23 is executed, following step S22.

In step S23, the processing section 11 executes a map data receiving process. The map data receiving process is the same as the process of steps S13 and S14 in the server-side pre-match process. That is, when map data has been received from the terminal apparatus 2, the processing section 11 saves the received map data. The process of step S24 is executed, following step S23.

In step S24, the processing section 11 determines whether a game start notification has been received from the terminal apparatus 2 via the communication section 13. Note that when the individual match game is started in the terminal apparatus 2, the terminal apparatus 2 transmits the game start notification to the server 1 (step S73 to be described below). When the determination result of step S24 is affirmative, the process of step S25 is executed. On the other hand, when the determination result of step S24 is negative, the process of step S29 is executed while skipping the series of processes of steps S25 to S28.

In step S25, the processing section 11 determines an opponent character to be used in the individual match game. The processing section 11 determines the opponent character based on the assessment value of the player character used by the user according to the method described in "[2-2. Process in individual match period]" above. For example, the game start notification may include information regarding the player character used by the user, and the processing section 11 may calculate the assessment value based on this information. The process of step S26 is executed, following step S25.

In step S26, the processing section 11 transmits information that is used for executing the individual match game (e.g., information that represents the opponent character determined in step S25) to the terminal apparatus 2 that has transmitted the game start notification, via the communication section 13. The process of step S27 is executed, following step S26.

In step S27, the processing section 11 receives information regarding the result of the individual match game from the terminal apparatus 2 via the communication section 13. Note that the individual match game is played on the terminal apparatus 2 that has received information transmitted from the server 1 in the process of step S26, and information representing the result of the individual match game is transmitted from this terminal apparatus 2 to the server 1 (step S75 to be described below). In step S27, the processing section 11 receives information thus transmitted from the terminal apparatus 2. Note that this information includes information used for calculating the score (e.g., whether the game has been cleared, the number of player characters defeated, and the number of defense buildings destroyed). Where the score is calculated in the terminal apparatus 2, this information may be information representing the score. The process of step S28 is executed, following step S27.

In step S28, the processing section 11 updates the result score as necessary. Specifically, the processing section 11 updates the score data stored in the memory when the score calculated based on the information received from a terminal apparatus 2 in step S27 is higher than the current result score of the user of the terminal apparatus 2 (i.e., the result score represented by the score data stored in the memory). On the other hand, the processing section 11 ends the process of step S28 without updating the score data when the score calculated based on the information received from a terminal apparatus 2 is lower than the current result score of the user of the terminal apparatus 2. The process of step S29 is executed, following step S28.

In step S29, the processing section 11 determines whether or not to end the server-side individual match process. For example, the processing section 11 determines whether a point in time at which the individual match period should be ended has arrived (or whether a predetermined length of time has elapsed since the start of the individual match period). When the determination result of step S29 is negative, the process of step S21 is executed again. Thereafter, the series of processes of steps S21 to S29 is executed repeatedly until it is determined to end the server-side individual match process. On the other hand, when the determination result of step S29 is affirmative, the processing section 11 ends the server-side individual match process and starts the server-side team match process (step S4).

Figure 15:
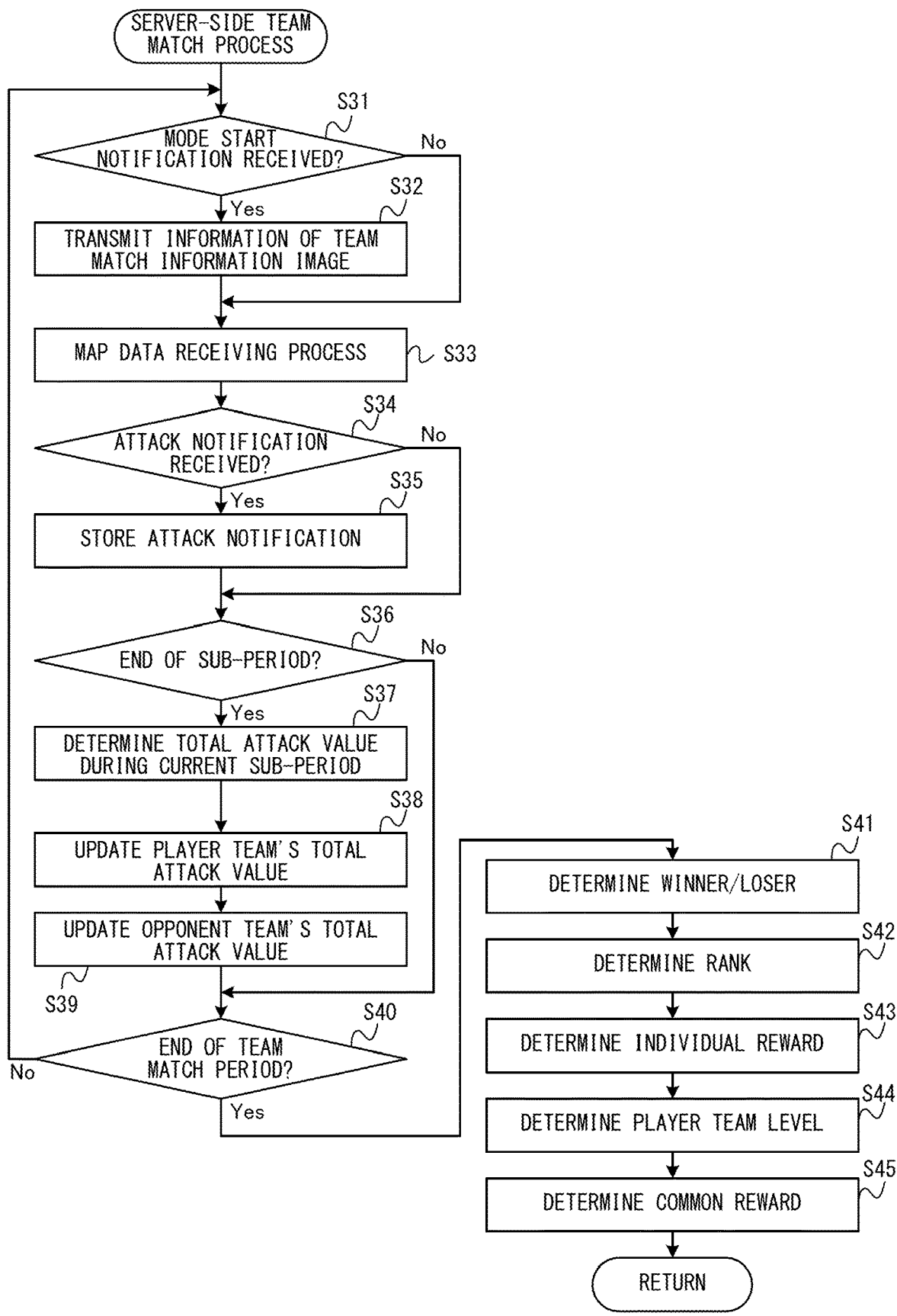
FIG. 15 is a sub-flow chart showing an example of a detailed flow of a non-limiting server-side team match process of step S4 shown in FIG. 12.

FIG. 15 is a sub-flow chart showing an example of a detailed flow of the server-side team match process of step S4 shown in FIG. 12. In the server-side team match process, first, in step S31, the processing section 11 determines whether a mode start notification has been received from the terminal apparatus 2 via the communication section 13. When the determination result of step S31 is affirmative, the process of step S32 is executed. On the other hand, when the determination result of step S31 is negative, the process of step S33 is executed while skipping the process of step S32.

In step S32, the processing section 11 transmits information that is presented to the user on the team match information image to the terminal apparatus 2 that has transmitted the mode start notification, via the communication section 13. For example, the processing section 11 transmits to the terminal apparatus 2 information regarding the remaining time before the end of the team match period, the result score, the content displayed on the player team information image 62 and the content displayed on the opponent information image 63. The process of step S33 is executed, following step S32.

In step S33, the processing section 11 executes a map data receiving process. The map data receiving process of step S33 is the same as the process of steps S13 and S14 in the server-side pre-match process. The process of step S34 is executed, following step S33.

In step S34, the processing section 11 determines whether an attack notification has been received from the terminal apparatus 2 via the communication section 13. Note that when the attack input is performed by the user in the team match game in the terminal apparatus 2, the terminal apparatus 2 transmits the attack notification to the server 1 (step S85 to be described below). When the determination result of step S34 is affirmative, the process of step S35 is executed. On the other hand, when the determination result of step S34 is negative, the process of step S36 is executed while skipping the process of step S35.

In step S35, the processing section 11 stores the attack notification received in step S34 in the memory. Note that the attack notification includes identification information representing the user who has performed the attack input and information representing the attack count. The process of step S36 is executed, following step S35.

In step S36, the processing section 11 determines whether or not to end the current sub-period. For example, the processing section 11 determines whether a point in time at which the current sub-period should be ended has arrived (or whether a predetermined length of time has elapsed since the start of the sub-period). When the determination result of step S36 is affirmative, the process of step S37 is executed. On the other hand, when the determination result of step S36 is negative, the process of step S40 is executed while skipping the series of processes of steps S37 to S39.

In step S37, the processing section 11 determines the total attack value of the player team for the sub-period that has been determined to be ended in the process of step S36. Specifically, based on the attack notification stored in step S35 during the preceding sub-period, the processing section 11 calculates the attack value for each of the attack inputs performed during the sub-period and corrects the calculated attack values with the combo bonus coefficient to calculate the sum of the corrected attack values. Thus, the total attack value of the player team in the sub-period is calculated. Note that the attack value and the total attack value of the player team are calculated according to the method described in "[2-3. Process in team match period]" above. The process of step S38 is executed, following step S37.

In step S38, the processing section 11 updates the total attack value of the player team. Specifically, the processing section 11 obtains the updated total attack value by adding the total attack value of the player team (i.e., the total attack value for one sub-period) determined in step S37 to the un-updated total attack value (specifically, the total attack value represented by the total attack value data stored in the memory). The processing section 11 updates the total attack value data described above so that it represents the updated total attack value. The process of step S39 is executed, following step S38.

In step S39, the processing section 11 updates the total attack value of the opponent team. The updated total attack value of the opponent team is calculated by adding the value calculated according to the method described in "[2-3. Process in team match period]" above to the un-updated total attack value (specifically, the total attack value represented by the total attack value data stored in the memory). The processing section 11 updates the opponent data described above so that it represents the updated total attack value. The process of step S40 is executed, following step S39.

In step S40, the processing section 11 determines whether or not to end the server-side team match process. For example, the processing section 11 determines whether a point in time at which the team match period should be ended has arrived (or whether a predetermined length of time has elapsed since the start of the team match period). When the determination result of step S40 is negative, the process of step S31 is executed again. Thereafter, the series of processes of steps S31 to S40 is executed repeatedly until it is determined to end the server-side team match process. On the other hand, when the determination result of step S40 is affirmative, the process of step S41 is executed.

In step S41, the processing section 11 determines the winner/loser of the team match game. That is, the processing section 11 determines whether the participating users have won or lost through a comparison between the total attack value of the player team and the total attack value of the opponent team at the end of the team match period. The process of step S42 is executed, following step S41.

In step S42, the processing section 11 determines the rank of each participating user. That is, the processing section 11 updates the rank at the start of the current game period based on the result score of the user according to the method described in "[2-2. Process in individual match period]" above. The processing section 11 updates the rank data described above so that it represents the updated rank. The process of step S43 is executed, following step S42.

In step S43, the processing section 11 determines individual rewards to be given to participating users for each participating user. That is, the processing section 11 determines the individual reward to be given to each user based on the rank of the user determined in step S42 according to the method described in "[2-3. Process in team match period]" above. The processing section 11 updates the reward data described above for each participating user so that the reward determined for the user is included therein. The process of step S44 is executed, following step S43.

In step S44, the processing section 11 determines the player team level. That is, according to the method described in "[2-3. Process in team match period]" above, the processing section 11 updates the player team level based on the win/loss of the participating users determined in step S41 and the current status for each sub-period (specifically, the number of times the player team has been decided "winning") during the subject team match period. The processing section 11 updates the player team level data described above so that it represents the updated player team level. The process of step S45 is executed, following step S44.

In step S45, the processing section 11 determines the common reward to be given to the participating users. That is, the processing section 11 determines the common reward based on the player team level determined in step S44 according to the method described in "[2-3. Process in team match period]" above. The processing section 11 updates the reward data described above for each participating user so that the reward determined for the user is included therein. After completion of the process of step S45, the processing section 11 ends the server-side team match period process and starts the server-side interval period process.

3-3. Process in Terminal Apparatus

Figure 16:
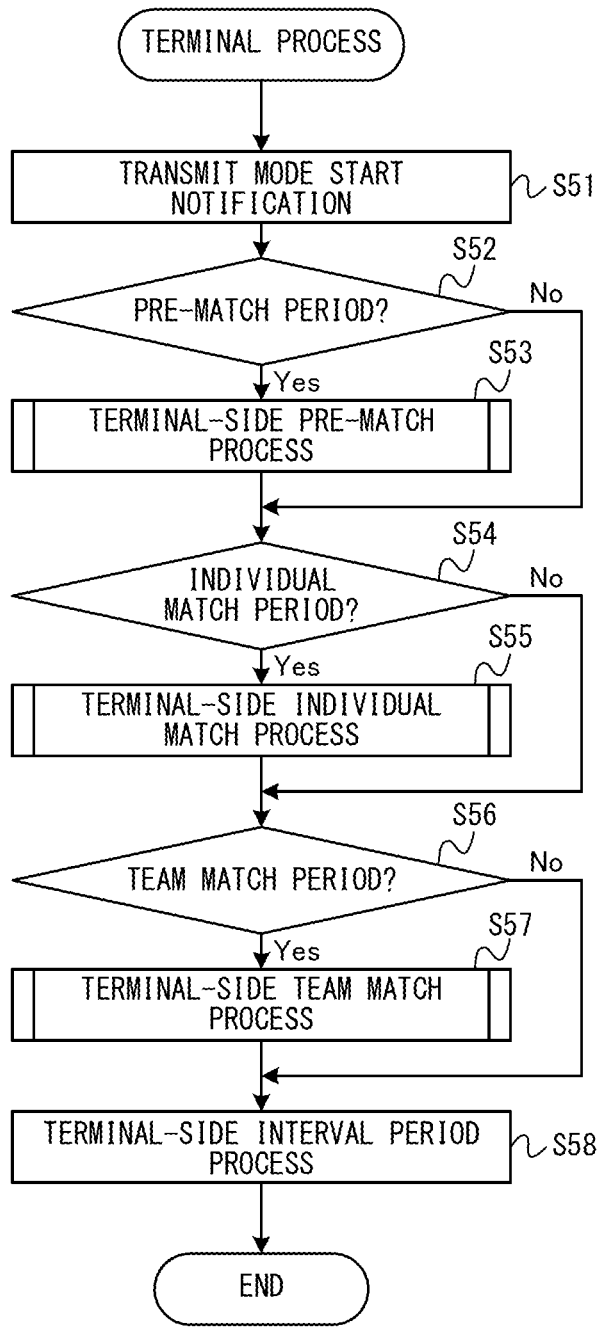
FIG. 16 is a flow chart showing an example of a flow of a non-limiting terminal process that is executed by a terminal apparatus.

FIG. 16 is a flow chart showing an example of a flow of a terminal process executed by the terminal apparatus 2.

Note that the terminal process shown in FIG. 16 is started in response to the start of the combined game mode described above while the program of the game application (i.e., the game program) stored in the storage section 22 is executed.

Note that the memory of the processing section 21 of the terminal apparatus 2 or the storage section 22 may store data similar to the data stored in the server 1 (refer to FIG. 11). Where data used when executing the terminal process is stored in the terminal apparatus 2, the terminal apparatus 2 requests the server 1 to transmit the data so that the terminal apparatus 2 can execute the terminal process using the data transmitted from the server 1.

In the terminal process shown in FIG. 16, first, in step S51, the processing section 21 transmits a mode start notification to the server 1 via the communication section 25. As described above, the server having received the mode start notification transmits to the terminal apparatus 2 information that is used for displaying various information images (e.g., the pre-match information image, etc.). The process of step S52 is executed, following step S51.

In step S52, the processing section 21 determines whether the current period is the pre-match period. Herein, in the present embodiment, it is assumed that the information that is transmitted from the server 1 in response to the mode start notification includes information that represents the current period. Therefore, the processing section 21 determines the current period based on information transmitted from the server 1. When the determination result of step S52 is affirmative, the process of step S53 is executed. On the other hand, when the determination result of step S52 is negative, the process of step S54 is executed while skipping the process of step S53.

In step S53, the processing section 21 executes the terminal-side pre-match process. The terminal-side pre-match process is a process that is executed on the terminal apparatus 2 side in the pre-match period described above. The details of the terminal-side pre-match process will be described below (refer to FIG. 17). The process of step S54 is executed, following step S53.

In step S54, the processing section 21 determines whether the current period is the individual match period. When the determination result of step S54 is affirmative, the process of step S55 is executed. On the other hand, when the determination result of step S54 is negative, the process of step S56 is executed while skipping the process of step S55.

In step S55, the processing section 21 executes the terminal-side individual match process. The terminal-side individual match process is a process that is executed on the terminal apparatus 2 side in the individual match period described above. The details of the terminal-side individual match process will be described below (refer to FIG. 18). The process of step S56 is executed, following step S55.

In step S56, the processing section 21 determines whether the current period is the team match period. When the determination result of step S56 is affirmative, the process of step S57 is executed. On the other hand, when the determination result of step S56 is negative, the process of step S58 is executed while skipping the process of step S57.

In step S57, the processing section 21 executes the terminal-side team match process. The terminal-side team match process is a process that is executed on the terminal apparatus 2 side in the team match period described above. The details of the terminal-side team match process will be described below (refer to FIG. 19). The process of step S58 is executed, following step S57.

In step S58, the processing section 21 executes the terminal-side interval period process. The terminal-side interval period process is a process that is executed on the terminal apparatus 2 side in the interval period described above. In the terminal-side interval period process, the processing section 21 executes a process of displaying an image representing a list of rewards that have been given to the user on the display section 24, and allowing the user to claim the rewards. Note that when the user claims a reward, the reward data stored in the server is updated by deleting the claimed reward. The individual user data stored in the server is updated so as to reflect the fact that the reward has been claimed (e.g., so that the item of the reward is owned by the user). In the terminal-side interval period process, when an instruction to end the combined game mode (e.g., an input on the end button image 30) is given by the user, the processing section 21 ends the terminal-side interval period process, thus ending the terminal process shown in FIG. 16.

Figure 17:
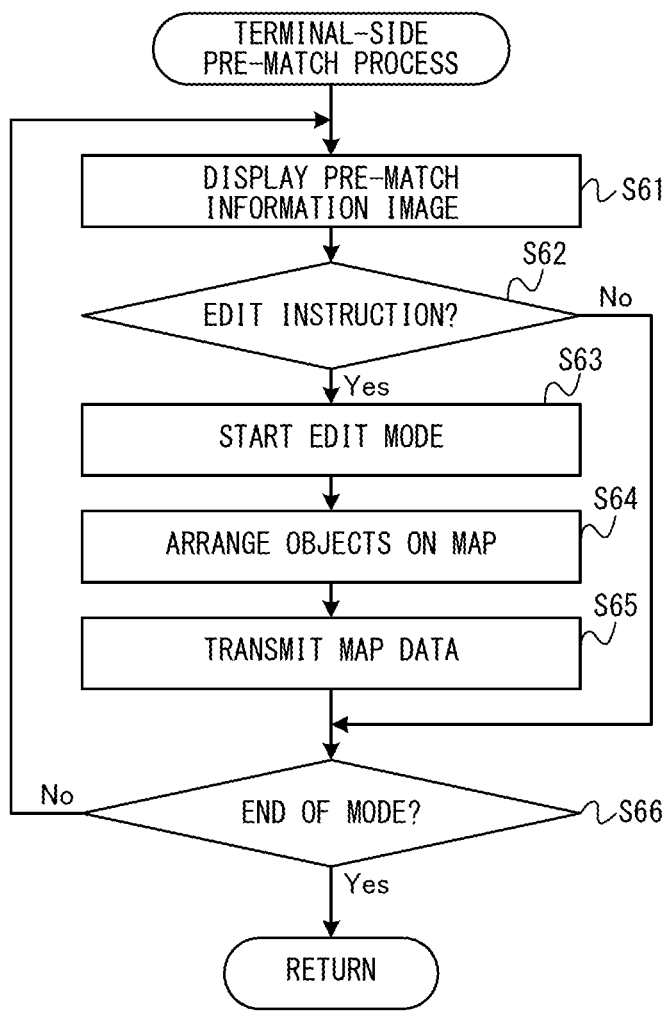
FIG. 17 is a sub-flow chart showing an example of a detailed flow of a non-limiting terminal-side pre-match process of step S53 shown in FIG. 16.

FIG. 17 is a sub-flow chart showing an example of a detailed flow of the terminal-side pre-match process of step S53 shown in FIG. 16. In the terminal-side pre-match process, first, in step S61, the processing section 21 displays the pre-match information image described above on the display section 24. Specifically, the server having received the mode start notification in the pre-match period transmits information that is used for displaying the pre-match information image to the terminal apparatus 2, and the processing section 21 receives this information and generates the pre-match information image based on the received information. The generated pre-match information image is displayed on the display section 24. The process of step S62 is executed, following step S61.

In step S62, the processing section 21 determines whether an instruction to start the edit mode described above has been given by the user. That is, the processing section 21 determines whether an input has been made on the edit button image 39 of the pre-match information image. When the determination result of step S62 is affirmative, the process of step S63 is executed. On the other hand, when the determination result of step S62 is negative, the process of step S66 is executed while skipping the process of steps S63 to S65.

In step S63, the processing section 21 starts the edit mode. Specifically, the processing section 21 generates the edit mode image described above (refer to FIG. 6) and displays the edit mode image on the display section 24. Note that in the present embodiment, it is assumed that the same data as the map data stored in the server 1 is stored also in the terminal apparatus 2. The processing section 21 generates and displays the map image 41 based on the map data. The process of step S64 is executed, following step S63.

In step S64, the processing section 21 arranges game objects on the game map based on instructions from the user. For example, the processing section 21 changes the arrangement of the game objects shown by the map image 41 based on instructions from the user. In this process, the processing section 21 imposes a limitation on the arrangement of player characters according to the method described in "[2-1. Process in pre-match period]" above. When an instruction to end the edit mode has been given by the user (e.g., an input has been made on the end button image 40), the processing section 21 ends the process of step S64. The process of step S65 is executed, following step S64.

In step S65, the processing section 21 transmits map data representing the game map after the process of step S64 to the server 1 via the communication section 25. Thus, the map data is stored in the server 1. The process of step S66 is executed, following step S65.

In step S66, the processing section 21 determines whether or not to end the combined game mode. For example, the processing section 21 determines whether an input has been made on the end button image 30 displayed on the display section 24. When the determination result of step S66 is negative, the process of step S61 is executed again. Thereafter, the series of processes of steps S61 to S66 is executed repeatedly until it is determined to end the combined game mode. On the other hand, when the determination result of step S66 is affirmative, the processing section 21 ends the terminal-side pre-match process, thus ending the terminal process shown in FIG. 16.

Figure 18:
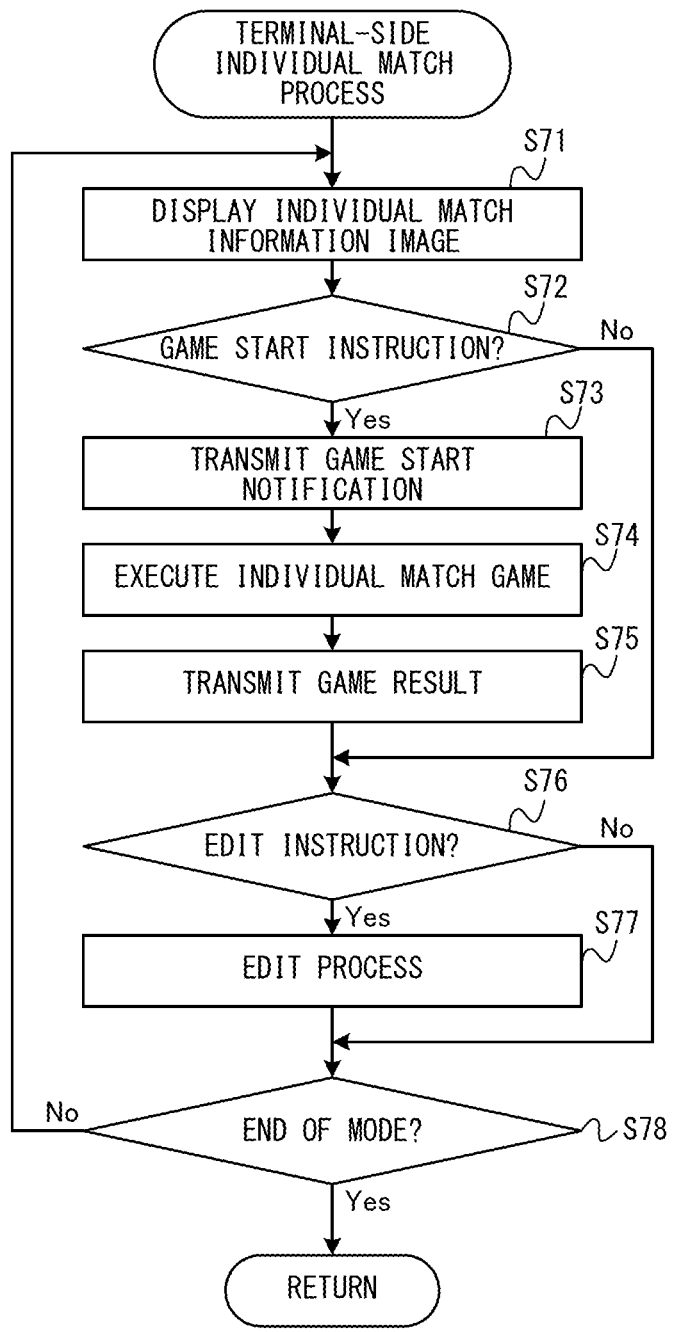
FIG. 18 is a sub-flow chart showing an example of a detailed flow of a non-limiting terminal-side individual match process of step S55 shown in FIG. 16.

FIG. 18 is a sub-flow chart showing an example of a detailed flow of the terminal-side individual match process of step S55 shown in FIG. 16. In the terminal-side individual match process, first, in step S71, the processing section 21 displays the individual match information image described above on the display section 24. Specifically, the server having received the mode start notification in the individual match period transmits information that is used for displaying the individual match information image to the terminal apparatus 2, and the processing section 21 receives this information and generates the individual match information image based on the received image. The generated individual match information image is displayed on the display section 24. The process of step S72 is executed, following step S71.

In step S72, the processing section 21 determines whether an instruction to start the individual match game has been given by the user. That is, the processing section 21 determines whether an input has been made on the game start button image of the individual match information image. When the determination result of step S72 is affirmative, the process of step S73 is executed. On the other hand, when the determination result of step S72 is negative, the process of step S76 is executed while skipping the process of steps S73 to S75.

In step S73, the processing section 21 transmits a game start notification that indicates the start of the individual match game to the server 1 via the communication section 25. In response to the game start notification, the server 1 transmits information that is used for executing the individual match game to the terminal apparatus 2 (step S27 shown in FIG. 14). The process of step S74 is executed, following step S73.

In step S74, the processing section 21 executes the individual match game. That is, the processing section 21 receives information that is used for executing the individual match game from the server 1, and starts the individual match game using the received information. While the individual match game is executed, the processing section 21 advances the individual match game based on inputs by the user. When the individual match game ends (that is, when the game is cleared or when the game is over), the processing section 21 ends the process of step S74 and executes the process of step S75.

In step S75, the processing section 21 transmits information regarding the result of the individual match game to the server 1 via the communication section 25. Note that this information may be information that is used for calculating the score of the individual match game or may be information of the score itself. The process of step S76 is executed, following step S75.

In step S76, the processing section 21 determines whether an instruction to start the edit mode described above has been given by the user. The process of step S76 is the same as the process of step S62 shown in FIG. 17. When the determination result of step S76 is affirmative, the process of step S77 is executed. On the other hand, when the determination result of step S76 is negative, the process of step S78 is executed while skipping the process of step S77.

In step S77, the processing section 21 executes the same edit process as the series of processes of steps S63 to S65 shown in FIG. 17. The process of step S78 is executed, following step S77.

In step S78, the processing section 21 determines whether or not to end the combined game mode. The process of step S78 is the same as the process of step S66 shown in FIG. 17. When the determination result of step S78 is negative, the process of step S71 is executed again. Thereafter, the series of processes of steps S71 to S78 is executed repeatedly until it is determined to end the combined game mode. On the other hand, when the determination result of step S78 is affirmative, the processing section 21 ends the terminal-side individual match process, thus ending the terminal process shown in FIG. 16.

Figure 19:
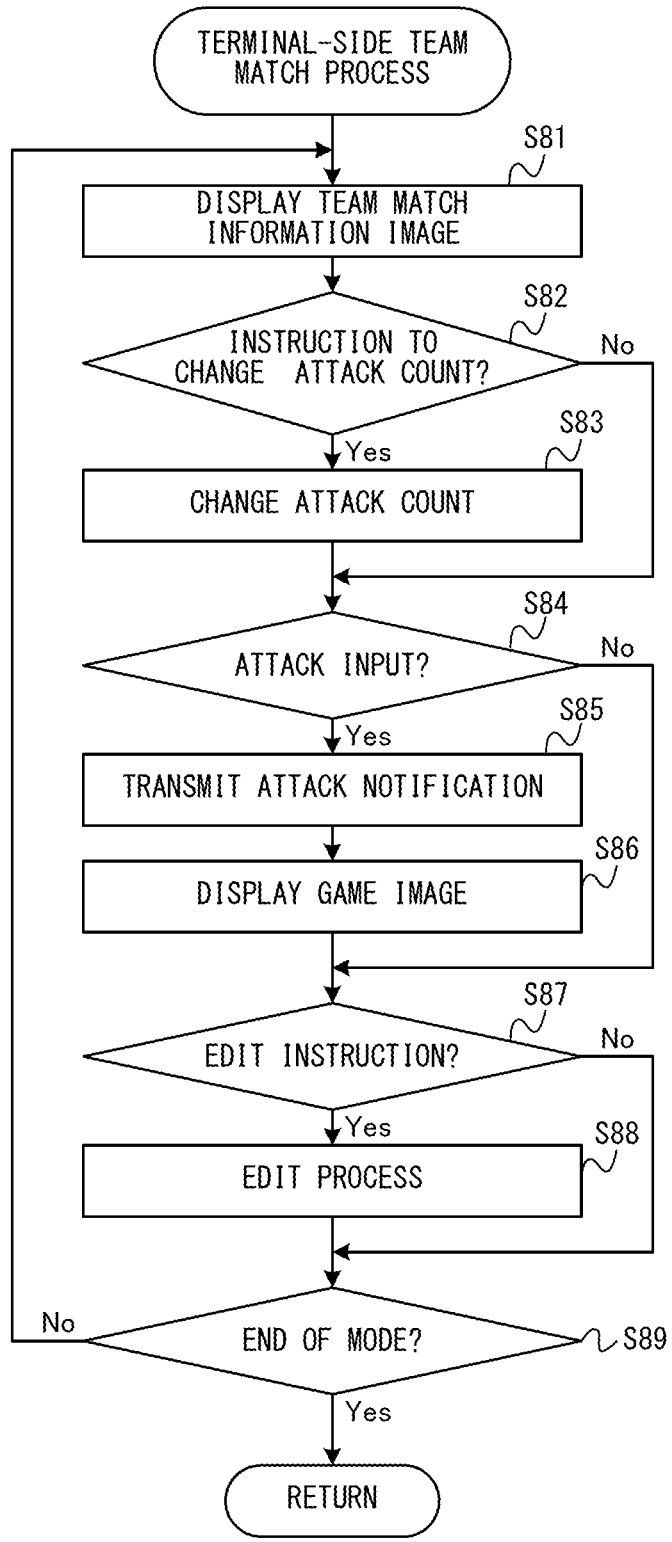
FIG. 19 is a sub-flow chart showing an example of a detailed flow of a non-limiting terminal-side team match process of step S57 shown in FIG. 16.

FIG. 19 is a sub-flow chart showing an example of a detailed flow of the terminal-side team match process of step S57 shown in FIG. 16. In the terminal-side team match process, first, in step S81, the processing section 21 displays the team match information image described above on the display section 24. Specifically, the server 1 having received the mode start notification in the team match period transmits information that is used for displaying the team match information image to the terminal apparatus 2, and the processing section 21 receives this information and generates the team match information image based on the received information. The generated team match information image is displayed on the display section 24. The process of step S82 is executed, following step S81.

In step S82, the processing section 21 determines whether an instruction to change the attack count in the team match game has been given by the user. That is, the processing section 21 determines whether an input has been made on the increase/decrease button image described above included in the team match information image. When the determination result of step S82 is affirmative, the process of step S83 is executed. On the other hand, when the determination result of step S82 is negative, the process of step S84 is executed while skipping the process of step S83.

In step S83, the processing section 21 updates the attack count based on the instruction of step S82. Specifically, the processing section 21 updates the number represented by the attack count image 64 included in the team match information image so that it represents the updated attack count. The process of step S84 is executed, following step S83.

In step S84, the processing section 21 determines whether the user has performed an attack input in the team match game. That is, the processing section 21 determines whether an input has been made on the attack button image 66 described above included in the team match information image. When the determination result of step S84 is affirmative, the process of step S85 is executed. On the other hand, when the determination result of step S84 is negative, the process of step S87 is executed while skipping steps S85 and S86.

In step S85, the processing section 21 transmits an attack notification indicating that an attack input has been performed to the server 1 via the communication section 25. The process of step S86 is executed, following step S85.

In step S86, the processing section 21 displays, on the display section 24, a game image showing the player character attacking the opponent team troop. The process of step S87 is executed, following step S86.

In step S87, the processing section 21 determines whether an instruction to start the edit mode described above has been given by the user. The process of step S87 is the same as the process of step S62 shown in FIG. 17. When the determination result of step S87 is affirmative, the process of step S88 is executed. On the other hand, when the determination result of step S87 is negative, the process of step S89 is executed while skipping the process of step S88.

In step S88, the processing section 21 executes the same edit process as the process of step S77 shown in FIG. 18. The process of step S89 is executed, following step S88.

In step S89, the processing section 21 determines whether or not to end the combined game mode. The process of step S89 is the same as the process of step S66 shown in FIG. 17. When the determination result of step S89 is negative, the process of step S81 is executed again. Thereafter, the series of processes of steps S81 to S89 is executed repeatedly until it is determined to end the combined game mode. On the other hand, when the determination result of step S89 is affirmative, the processing section 21 ends the terminal-side team match process, thus ending the terminal process shown in FIG. 16.

4. Function/Effect of Present Embodiment and Variations

As described in the embodiment above, the information processing system includes the following components:
- a game period manager (steps S1 to S4) configured to manage a game period that is common among a plurality of users, the game period including a first period (e.g., the individual match period) and a second period following the first period (e.g., the team match period);
- a first game executer (step S74) configured to advance a first game (e.g., the individual match game) for each user in the first period;
- an individual reward determiner (step S43) configured to determine an individual reward for each user based on a first individual parameter (e.g., the result score) representing the result of the first game for the user;
- a rank obtainer (step S42) configured to obtain a rank of each user that is determined based on the first individual parameter of the user for the first game from a past game period;
- a parameter determiner (step S37) configured to determine a second individual parameter (e.g., the attack value (which herein means to include the attack value that has been corrected with the combo bonus coefficient)) for each user based on the rank of the user and the first individual parameter of the user for the first game from the current game period;
- a second game executer (steps S38, S39 and S41) configured to, in the second period, determine a common parameter (e.g., the total attack value of the player team) that is common among the plurality of users based on the second individual parameters for users who have performed a particular game input (e.g., the attack input) so as to advance a second game that is common among the plurality of users based on the common parameter; and
- a common reward determiner (step S45) configured to determine a common reward that is common among the plurality of users based on a result of the second game.

With the configuration described above, the result (i.e., the first individual parameter) of the first game, which is individually played by each of the plurality of users, can be reflected in the second game, which is played by the plurality of users cooperating with each other. Thus, users can play a game in which the first game and the second game are linked together. With the configuration described above, by using the second individual parameter, the rank of each user can be reflected in the second game, in addition to the first individual parameter. Thus, it is possible to motivate the users to continuously play the game so that more users participate in the game. Moreover, with the configuration described above, the first period in which the first game is played and the second period in which the second game is played are separated from each other. Thus, the users are allowed to take sufficient time in the first game while a simple game input can be used in the second game. Thus, it is possible to improve the operability in the second game while ensuring the playability of the game as a whole including the first game and the second game.

Note that the individual parameter refers to a parameter that is set for each of a plurality of users. Note that the value of the individual parameter of one user may be equal to the value of the individual parameter of another user. On the other hand, the common parameter refers to a parameter that is set for the plurality of users.

Note that in the embodiment described above, the game period includes a period that is different from the first period and the second period (e.g., the pre-match period). In other embodiments, the game period may include no pre-match period and only include the first period and the second period. In other embodiments, the game period may include a period that is different from the first period, the second period and the pre-match period. For example, the game period may include a reward-claiming period in which the user can claim rewards that have been given to the user after the end of the second period.

The embodiment described above is applicable to a game program and a game system, for example, with the aim of realizing a game played by a plurality of users, the game including a first game that is played by each player and a second game that is played by the plurality of users cooperating with each other, wherein the first game and the second game are linked together.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
  a computer server system that includes a processor and a memory coupled thereto, the processor of the computer server system being configured to control the processor to at least:
    (a) track a game period that is common for a plurality of users, the game period including a first period and a second period following the first period, the first period for a first game that is played individually by each of the plurality of users and the second period for a second game that is played cooperatively by the plurality of users with each other,
    (b) initiate, for each respective one of the plurality of users, the first game that is played individually by each respective one of the plurality of users;
    (c) obtain, in connection with each respective one of the plurality of users for the first game, a corresponding first individual parameter that corresponds to a result of the first game for the respective user, (d) obtain a rank of each respective one of the plurality of users that is determined based on the first individual parameter of the respective user for the first game that is played individually from a past game period;

(e) determine a second individual parameter for each respective one of the plurality of users that is based on a combination of the rank of the respective user and the first individual parameter of the respective user for the first game from a current game period;

(f) initiate, for the second period and after completion of the first game for the first period for each of the plurality of users, the second game that is played cooperatively by the plurality of users with each other, (g) obtain, for each respective user of the plurality of users that participating in the second game that is played cooperatively, a total number of times that a particular game input has been performed for that respective user, (h) determine a common parameter that is common among the plurality of users based on the second individual parameters for users who have performed the particular game input for the second game in the second period so as to advance the second game based on the common parameter; and (i) determine a common reward that is common among the plurality of users based on a shared result of the second game for the plurality of users; and at least one computer terminal out of a plurality of computer terminals that communicate, via an electronic network, with the computer server system, the at least one computer terminal being programmed to:

execute the first game and, as part of the first game, receive input(s) from a corresponding user to move and/or control, within a virtual game space, at least one character of a plurality of characters that are presented as part of the first game, calculate, based on at least in part on the received input(s), the first parameter and transmit the first parameter to the computer server, as part of the first game, output, to a display that is coupled to the at least one computer terminal, a progress indicator that indicates how much time is left in the first period for the first game, as part of the second game, receive the particular game input, generate and transmit, based on the received particular game input, a data message to the computer server system, as part of the second game, output, to the display that is coupled to the at least one computer terminal, (1) a progress indicator that indicates how much time is left in the second period for the second game, and (2) the common parameter that is based on performance of the particular game input by each user in connection with the plurality of computer terminals, and wherein the first game and the second game are different, wherein, for the second game, the particular game input that is used by each user is a simpler input than the inputs used for the first game.

2. The information processing system according to claim 1, wherein the processor is configured to control the information processing system to at least determine the second individual parameter in accordance with a point in time within the second period at which the particular game input is performed.

3. The information processing system according to claim 2, wherein:
the second period is divided into a plurality of sub-periods; and
the processor is configured to control the information processing system to at least determine the common parameter based on the total number of times the particular game input has been performed by the plurality of users within one sub-period.

4. The information processing system according to claim 3, wherein the processor is configured to control the information processing system to at least, after an end of a sub-period, determine the common parameter based on the second individual parameters in accordance with the particular game inputs that have been performed by the plurality of users in the sub-period.

5. The information processing system according to claim 3, wherein the processor is configured to control the information processing system to at least:
receive, from the user, an input that specifies a number of times, together with the particular game input, in the second period; and
when the particular game input is performed by the user in the second period, determine the second individual parameter based on the number of times specified by the user and the first individual parameter of the user.

6. The information processing system according to claim 2, wherein:
the second period is divided into a plurality of sub-periods; and
the processor is configured to control the information processing system to at least, based on a result of comparison between the common parameter up to a point in time when each sub-period in the second period ends and a reference value, determine the second individual parameter in accordance with the particular game inputs that are performed in one sub-period after the point in time.

7. The information processing system according to claim 1, wherein the processor is configured to control the information processing system to at least:
determine the rank of each user in the current game period based on a result of comparison between the first individual parameter of the user for the first game from a past game period and the first individual parameter of another user for the first game from the past game period.

8. The information processing system according to claim 7, wherein the processor is configured to control the information processing system to at least determine a new rank for each user based on the rank of the user and a result of comparison for the first individual parameter of the user in the current game period, wherein the rank of the user is determined based on the first individual parameter of the user for the first game from one or more game periods including at least the previous game period.

9. The information processing system according to claim 1, wherein the processor is configured to control the information processing system to at least determine the first individual parameter for the user based on an ability parameter that represents an ability of a game object used in the first game.

10. The information processing system according to claim 9, wherein the processor is configured to control the information processing system to at least determine the first individual parameter of the user that is determined in the first period of the current game period based on the rank that is determined based on the first individual parameter of the user for the first game from one or more game periods including at least the previous game period.

11. The information processing system according to claim 1, wherein the processor is configured to control the information processing system to at least:
determine the first individual parameter so that a value of the first individual parameter is higher as an evaluation of a result of the first game is better, and
determine the second individual parameter so that the plurality of users have more advantage playing the second game as the first individual parameter is higher.

12. The information processing system according to claim 1, wherein the processor is configured to control the information processing system to at least:
allow one user to play the first game a plurality of times in the first period; and
when the first game is played a plurality of times by the user in the first period, determine the second individual parameter of the user based on a highest or lowest one of the first individual parameters for the user in the first period.

13. The information processing system according to claim 1, wherein the processor is configured to control the information processing system to at least exclude a user or users who have not performed the particular game input in the second period from a group of users who are given the common reward.

14. The information processing system according to claim 1, wherein the processor is configured to control the information processing system to at least determine the second individual parameter based on the first individual parameter of a predetermined value for a user or users, among the plurality of users, who have not performed the first game in the first period of the current game period.

15. The information processing system according to claim 1, wherein:
the second period is divided into a plurality of sub-periods; and
the processor is configured to control the information processing system to at least evaluate the second game based on the common parameter for each of the sub-periods, and determine the common reward based on the evaluation for the sub-period.

16. The information processing system according to claim 1, wherein the processor is configured to control the information processing system to at least:
based on an instruction from the user, arrange a game object of a first type and a game object of a second type on a game map used in the first game, wherein the game object of the first type is controlled by the user and the game object of the second type influences at least one of the game object of the first type and an opponent object.

17. The information processing system according to claim 16, wherein the processor is configured to control the information processing system to at least determine an item used for creating or strengthening a game object of the second type as an individual reward.

18. An information processing apparatus comprising a processor and a memory coupled thereto, the processor being configured to control the information processing apparatus to at least:
(a) track a game period that is common for a plurality of users, the game period including a first period and a second period following the first period, the first period for a first game that is played individually by each of the plurality of users and the second period for a second game that is played cooperatively by the plurality of users with each other,
(b) initiate, for each respective one of the plurality of users, the first game that is played individually by each respective one of the plurality of users;
(c) obtain, in connection with each respective one of the plurality of users for the first game, a corresponding first individual parameter that corresponds to a result of the first game for the respective user,
(d) obtain a rank of each respective one of the plurality of users that is determined based on the first individual parameter of the respective user for the first game that is played individually from a past game period;
(e) determine a second individual parameter for each respective one of the plurality of users that is based on a combination of the rank of the respective user and the first individual parameter of the respective user for the first game from a current game period;
(f) initiate, for the second period and after completion of the first game for the first period for each of the plurality of users, the second game that is played cooperatively by the plurality of users with each other;
(g) obtain, for each respective user of the plurality of users that participating in the second game that is played cooperatively, a total number of times that a particular game input has been performed for that respective user;
(h) determine a common parameter that is common among the plurality of users based on the second individual parameters for users who have performed the particular game input for the second game in the second period so as to advance the second game based on the common parameter, and
(i) determine a common reward that is common among the plurality of users based on a shared result of the second game for the plurality of users,
communicate with at least one computer terminal out of a plurality of computer terminals to cause the at least one computer terminal to perform operations comprising:
executing, on at least one computer terminal of a plurality of computer terminals, the first game and, as part of the first game, receive input(s) from a corresponding user to move and/or control, within a virtual game space, at least one character of a plurality of characters that are presented as part of the first game,
calculating, based on at least in part on the received input(s), the first parameter and transmitting the first parameter to the information processing apparatus,
as part of the first game, outputting, to a display that is coupled to the at least one computer terminal, a progress indicator that indicates how much time is left in the first period for the first game,
as part of the second game, receiving, at the at least one computer terminal, the particular game input,
transmitting, based on the received particular game input, a data message to a computer server system, and
as part of the second game, outputting, to the display that is coupled to the at least one computer terminal, (1) a progress indicator that indicates how much time is left in the second period for the second game, and (2) the common parameter that is based on performance of the particular game input by each user in connection with the plurality of computer terminals,
wherein the first game and the second game are different, wherein, for the second game, the particular game input that is used by each user is a simpler input than the inputs used for the first game.

19. A non-transitory computer-readable storage medium storing computer-executable instructions that are configured to be executed by one or more hardware processors of an information processing apparatus, the computer-executable instructions comprising instructions that are configured to cause the processor to perform operations comprising:
(a) tracking a game period that is common for a plurality of users, the game period including a first period and a second period following the first period, the first period for a first game that is played individually by each of the plurality of users and the second period for a second game that is played cooperatively by the plurality of users with each other,
(b) initiating, for each respective one of the plurality of users, the first game that is played individually by each respective one of the plurality of users;
(c) obtaining, in connection with each respective one of the plurality of users for the first game, a corresponding first individual parameter that corresponds to a result of the first game for the respective user,
(d) obtaining a rank of each respective one of the plurality of users that is determined based on the first individual parameter of the respective user for the first game that is played individually from a past game period;
(e) determining a second individual parameter for each respective one of the plurality of users that is based on a combination of the rank of the respective user and the first individual parameter of the respective user for the first game from a current game period;
(f) initiating, for the second period and after completion of the first game for the first period for each of the plurality of users, the second game that is played cooperatively by the plurality of users with each other;
(g) obtaining, for each respective user of the plurality of users that participating in the second game that is played cooperatively, a total number of times that a particular game input has been performed for that respective user;
(h) determining a common parameter that is common among the plurality of users based on the second individual parameters for users who have performed the particular game input for the second game in the second period so as to advance the second game based on the common parameter,
(i) determining a common reward that is common among the plurality of users based on a shared result of the second game for the plurality of users;
executing the first game and, as part of the first game, receive input(s) from a corresponding user to move and/or control, within a virtual game space, at least one character of a plurality of characters that are presented as part of the first game;
calculating, based on at least in part on the received input(s), the first parameter and transmit the first parameter to a computer server system;
as part of the first game, outputting, to a display that is coupled to at least one computer terminal of a plurality of computer terminals, a progress indicator that indicates how much time is left in the first period for the first game;
as part of the second game, receiving the particular game input;
transmitting, based on the particular game input, a data message to the computer server system; and
as part of the second game, outputting, to the display that is coupled to the at least one computer terminal, (1) a progress indicator that indicates how much time is left in the second period for the second game, and (2) the common parameter that is based on performance of the particular game input by each user in connection with the plurality of computer terminals,
wherein the first game and the second game are different,
wherein, for the second game, the particular game input that is used by each user is a simpler input than the inputs used for the first game.

20. A computer-implemented information processing method comprising:
(a) tracking a game period that is common for a plurality of users, the game period including a first period and a second period following the first period, the first period for a first game that is played individually by each of the plurality of users and the second period for a second game that is played cooperatively by the plurality of users with each other,
(b) initiating, for each respective one of the plurality of users, the first game that is played individually by each respective one of the plurality of users;
(c) obtaining, in connection with each respective one of the plurality of users for the first game, a corresponding first individual parameter that corresponds to a result of the first game for the respective user,
(d) obtaining a rank of each respective one of the plurality of users that is determined based on the first individual parameter of the respective user for the first game that is played individually from a past game period;
(e) determining a second individual parameter for each respective one of the plurality of users that is based on a combination of the rank of the respective user and the first individual parameter of the respective user for the first game from a current game period;
(f) initiating, for the second period and after completion of the first game for the first period for each of the plurality of users, the second game that is played cooperatively by the plurality of users with each other;
(g) obtaining, for each respective user of the plurality of users that participating in the second game that is played cooperatively, a total number of times that a particular game input has been performed for that respective user;
(h) determining a common parameter that is common among the plurality of users based on the second individual parameters for users who have performed the particular game input for the second game in the second period so as to advance the second game based on the common parameter,
(i) determining a common reward that is common among the plurality of users based on a shared result of the second game for the plurality of users;
executing, on at least one computer terminal of a plurality of computer terminals, the first game and, as part of the first game, receive input(s) from a corresponding user to move and/or control, within a virtual game space, at least one character of a plurality of characters that are presented as part of the first game;
calculating, based on at least in part on the received input(s), the first parameter and transmit the first parameter to a computer server system;
as part of the first game, outputting, to a display that is coupled to the at least one computer terminal, a progress indicator that indicates how much time is left in the first period for the first game;

as part of the second game, receiving, at the at least one computer terminal, the particular game input;

transmitting, based on the received particular game input, a data message to the computer server system; and as part of the second game, outputting, to the display that is coupled to the at least one computer terminal, (1) a progress indicator that indicates how much time is left in the second period for the second game, and (2) the common parameter that is based on performance of the particular game input by each user in connection with the plurality of computer terminals, wherein the first game and the second game are different, wherein, for the second game, the particular game input that is used by each user is a simpler input than the inputs used for the first game.

21. The information processing system of claim 1, wherein the processor is configured to control the information processing system to at least:

divide the second period into a plurality of sub-periods;

set, for each one of the plurality of users, a maximum threshold usage that corresponds to how many times, during the second period, that the particular game input for a given user may be performed;

automatically generate, for each one of the plurality of sub-periods, at least first and second coefficients that are each based inputs provided from the plurality of users during the second game, wherein at least the first coefficient is based on how many times the particular game input has been performed within one sub-period for all of the plurality of users that have participated within that one sub-period; and automatically update, upon conclusion of each one of the plurality of sub-periods, the common parameter, wherein each updating is based on the respectively calculated first and second coefficients.

22. The information processing system of claim 21, wherein the first and second coefficients that are generated for a given one of the plurality of sub-periods are, respectively, based on inputs from the plurality of users from different ones of the plurality of sub-periods.

* * * * *